United States Patent [19]
Toda

[11] Patent Number: 5,717,434
[45] Date of Patent: Feb. 10, 1998

[54] ULTRASONIC TOUCH SYSTEM

[76] Inventor: Kohji Toda, No. 49-18, Futaba 1-chome, Yokosuka-shi Kanagawa-ken, 239, Japan

[21] Appl. No.: 374,599

[22] PCT Filed: Jul. 23, 1993

[86] PCT No.: PCT/JP93/01028

§ 371 Date: Jan. 23, 1995

§ 102(e) Date: Jan. 23, 1995

[87] PCT Pub. No.: WO94/02911

PCT Pub. Date: Feb. 3, 1994

[30] Foreign Application Priority Data

| Jul. 24, 1992 | [JP] | Japan | 4-218335 |
| Jul. 24, 1992 | [JP] | Japan | 4-218336 |
| Jul. 24, 1992 | [JP] | Japan | 4-218338 |
| Aug. 27, 1992 | [JP] | Japan | 4-254151 |
| Aug. 27, 1992 | [JP] | Japan | 4-254152 |
| Nov. 2, 1992 | [JP] | Japan | 4-317700 |
| Feb. 2, 1993 | [JP] | Japan | 5-015533 |
| Jun. 5, 1993 | [JP] | Japan | 5-160473 |

[51] Int. Cl.$^6$ ............................................. G06F 3/03
[52] U.S. Cl. ............................................... 345/177
[58] Field of Search .......................... 345/177, 84, 87, 345/55, 106; 310/334

[56] References Cited

U.S. PATENT DOCUMENTS

| 3,807,831 | 4/1974 | Soref. |
| 3,975,085 | 8/1976 | Yamada et al.. |
| 4,173,009 | 10/1979 | Toda. |
| 4,236,156 | 11/1980 | Eden. |
| 4,296,348 | 10/1981 | Toda. |
| 4,636,786 | 1/1987 | Haertling. |
| 4,908,542 | 3/1990 | Solie. |
| 5,017,913 | 5/1991 | Kaneko et al.. |
| 5,095,215 | 3/1992 | Shorrocks et al.. |
| 5,117,270 | 5/1992 | Toda. |
| 5,135,295 | 8/1992 | Jen et al.. |

Primary Examiner—Mark R. Powell
Attorney, Agent, or Firm—Young & Thompson

[57] ABSTRACT

An ultrasonic touch system including a substrate and at least an ultrasonic transducing system on one end surface Z1 of the substrate. The ultrasonic transducing system comprises at least an interdigital transducer P and at least an interdigital transducer Q corresponding to the interdigital transducer P. An electric signal having a frequency approximately corresponding to the interdigital periodicity of the interdigital transducer P is applied to the interdigital transducer P, causing the acoustic wave on the end surface Z1 with a high efficiency, the acoustic wave having a wavelength approximately equal to the interdigital periodicity of the interdigital transducer P. At this time, an electric signal having a frequency approximately corresponding to the wavelength of the acoustic wave generated on the end surface Z1 is detected at the interdigital transducer Q. When touching with a finger or other things on a part of the propagation medium of the acoustic wave on the end surface Z1, the electric signal detected at the interdigital transducer Q is decreased. A touch on the substrate by a finger or other things is accordingly detected with a high sensitivity and a quick response time under operation with low power consumption and low voltage.

15 Claims, 17 Drawing Sheets

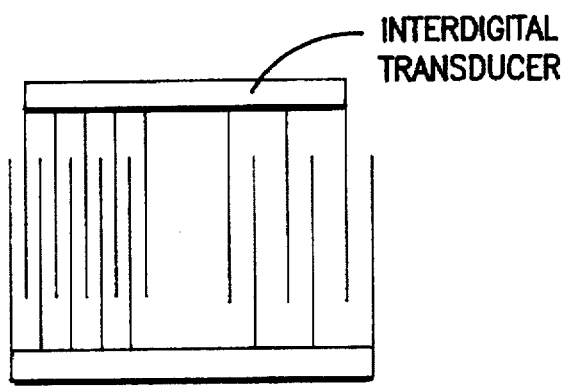
FIG. 18A
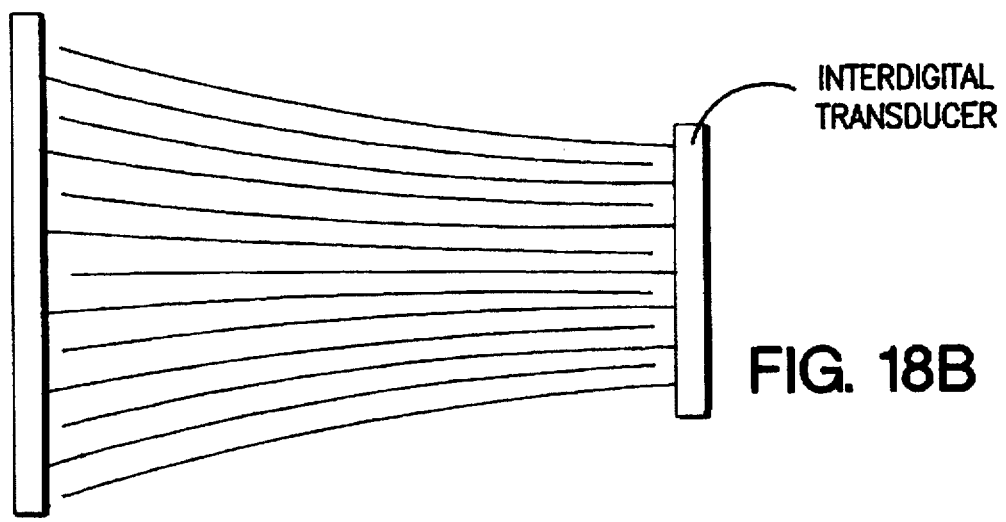
FIG. 18B
FIG. 28A
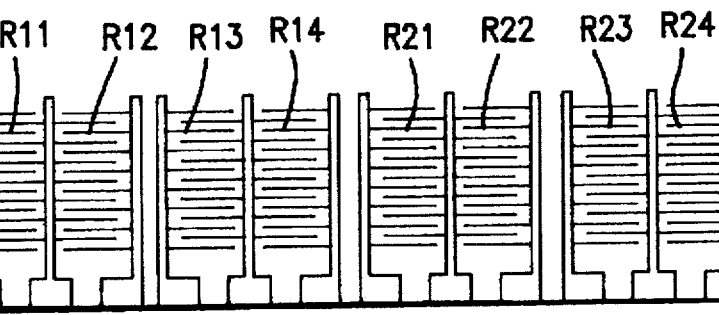
FIG. 28B

ULTRASONIC TOUCH SYSTEM

BACKGROUND OF THE INVENTION

1. Field of the Invention

The present invention relates to an ultrasonic touch system, having a substrate and an ultrasonic transducing system on one end surface thereof, for sensing a touch on the end surface of the substrate with a finger or other things, the ultrasonic transducing system comprising ultrasonic input and output devices, composed of at least one interdigital transducer, respectively.

2. Description of the Prior Art

Conventional touch panels are classified into two types, resistance film-type and ultrasonic type. The resistance film-type touch panel has an electrically conductive transparent film, the magnitude of the resistance of the transparent film changing when the transparent film is touched. The resistance film-type touch panel operating under low power consumption has some problems with response time, sensitivity, durability and others. The ultrasonic type touch panel has an acoustically vibrating nonpiezoelectric plate in which the vibration decreases when the nonpiezoelectric plate is touched. Conventional methods and devices for generating the acoustic vibration on a nonpiezoelectric plate include vibrating the plate indirectly with a wedge-shaped transducer with a bulk wave vibrator, vibrating the plate directly by a piezoelectric thin film transducer, and other means. The wedge-shaped transducer is used for nondestructive evaluation by ultrasound and for others and uses a comparatively low frequency because of the difficulty with the manufacturing accuracy of the wedge angle and so on. The piezoelectric thin film transducer, in which a piezoelectric thin film made from ZnO and others is mounted on a nonpiezoelectric plate with interdigital transducers generating acoustic vibration thereon, is used as a high frequency device for the reason that the interdigital transducer shows various transmission characteristics according to the structure thereof. However, the piezoelectric thin film transducer has operation frequencies limited to the UHF and VHF bands, and has some problems with fabrication and mass-production. Thus, there are some problems with response time, sensitivity, durability, manufacture, mass-production and others in conventional touch panels having limited operating frequencies.

SUMMARY OF THE INVENTION

An object of the present invention is to provide a touch system capable of generating an acoustic vibration on a substrate with high efficiency.

Another object of the present invention is to provide a touch system capable of sensing a touch on the substrate with a high sensitivity and a quick response time.

Another object of the present invention is to provide a touch system excellent in durability, manufacture, mass-production and others.

A still other object of the present invention is to provide a touch system operating under low power consumption with low voltage.

A still further object of the present invention is to provide a touch system with a small size which is very light in weight and has a simple structure.

According to one aspect of the present invention there is provided a touch system comprising a substrate and at least an ultrasonic transducing system on one surface Z1 of the substrate, the ultrasonic transducing system comprising at least one interdigital transducer P and at least one interdigital transducer Q corresponding to the interdigital transducer P.

According to another aspect of the present invention there is provided a means for applying the interdigital transducer P with an electric signal having a frequency approximately corresponding to the interdigital periodicity of the interdigital transducer P, and then generating an acoustic wave, having a wavelength approximately equal to the interdigital periodicity on the surface Z1.

According to another aspect of the present invention there is provided a means for delivering an electric signal, having a frequency approximately corresponding to the wavelength of the acoustic wave on the end surface Z1, from the interdigital transducer Q, the interdigital transducers P and Q being arranged face to face each other to make a pair such that the transmitting direction of the acoustic wave by the interdigital transducer P is the same as the receiving direction of the acoustic wave by the interdigital transducer Q wherein transducers P and Q each have at least two corresponding sets of transducer elements, each set having a different periodicity.

According to another aspect of the present invention there is provided a means for sensing a touch on a part of the propagation medium of the acoustic wave on the surface Z1 by the magnitude of the electric signal detected at the interdigital transducer Q.

According to another aspect of the present invention there is provided a substrate made from an almost transparent piezoelectric ceramic, the direction of the polarization axis thereof being parallel to the direction of thickness thereof, the interdigital transducers P and Q being mounted on the surface Z1 directly.

According to another aspect of the present invention there is provided a substrate made from a nonpiezoelectric body, the ultrasonic transducing system comprising an input device A, consisting of a piezoelectric thin plate TA and the interdigital transducer P mounted thereon, and an output device B consisting of a piezoelectric thin plate TB and the interdigital transducer Q mounted thereon, the piezoelectric thin plates TA and TB being mounted on the surface Z1.

According to another aspect of the present invention there is provided an ultrasonic transducing system comprising N interdigital transducers $P_i$ (i=1, 2, ..., N) and N interdigital transducer groups $Q_i$ (i=1, 2, ..., N) consisting of at least two interdigital transducers, $Q_{i-1}$ and $Q_{i-2}$.

According to another aspect of the present invention there is provided a connection point $M_1$, each output terminal of the interdigital transducers $Q_{i-1}$ being connected with each other thereat.

According to another aspect of the present invention there is provided a connection point $M_2$, each output terminal of the interdigital transducers $Q_{i-2}$ being connected with each other thereat, a touch on a part of the propagation medium of the acoustic wave on the surface Z1 being detected by the magnitudes of the electric signals delivered from the connection points $M_1$ and $M_2$, respectively.

According to another aspect of the present invention there are provided N switches $S_i$ (i=1, 2, ..., N), output terminal thereof being connected with each input terminal of the interdigital transducers $P_i$.

According to another aspect of the present invention there is provided a means for controlling turn on and off of the switches $S_i$ with a fixed period, a connection point MS, each input terminal of the switches $S_i$ being connected with each other thereat.

According to other aspect of the present invention there is provided an amplifier, the connection point $M_1$ being connected with the connection point MS through the amplifier.

According to a further aspect of the present invention there are provided N oscillators $H_i$ (i=1, 2, ..., N) including N corresponding propagation paths $D_i$ (i=1, 2, ..., N) as delay elements, the propagation paths $D_i$ comprising the substrate between the interdigital transducers $P_i$ and the interdigital transducers $Q_{i-1}$, the respective signal loops of the oscillators $H_i$ comprising the interdigital transducers $P_i$, the propagation paths $D_i$, the interdigital transducers $Q_{i-1}$ and the amplifier.

BRIEF DESCRIPTION OF THE DRAWINGS

Other features and advantages of the invention will be clarified from the following description with reference to the attached drawings.

FIG. 18(a) shows a plan view of an interdigital transducer having two sets of transducer elements having different periodicities taking the place of that seen in FIG. 16.

FIG. 18(b) shows a plan view of an interdigital transducer taking the place of that seen in FIG. 16.

FIG. 28 shows a plan view of the interdigital transducers T1, T2, R11, R12, R13, R14, R21, R22, R23 and R24 in the ultrasonic touch system shown in FIG. 27.

DETAILED DESCRIPTION OF THE PRESENTLY PREFERRED EXEMPLARY EMBODIMENTS

Figure 1:
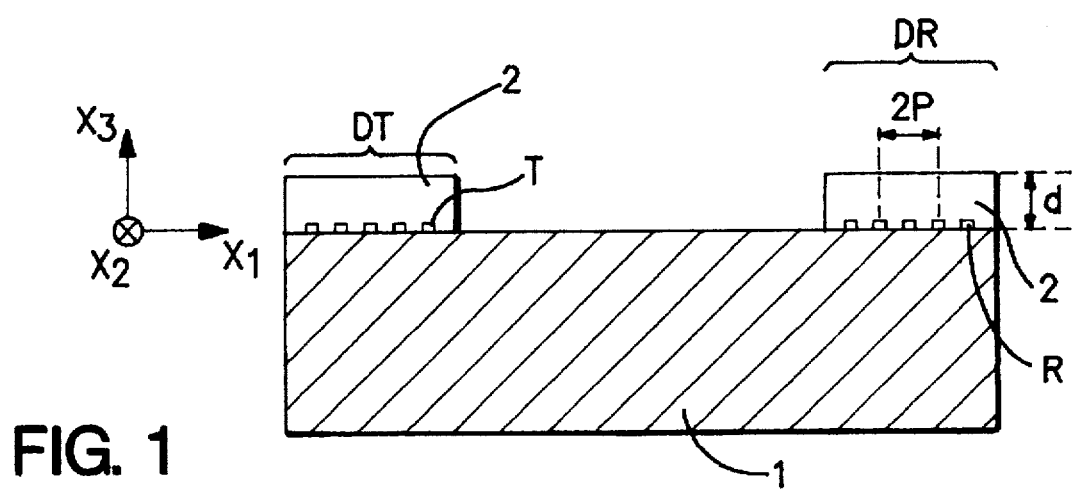
FIG. 1 shows a sectional view of the ultrasonic touch system according to a first embodiment of the present invention.

FIG. 1 shows a sectional view of an ultrasonic touch system according to a first embodiment of the present invention. The ultrasonic touch system comprises an input device DT, an output device DR and a substrate 1 made from a borosilicate glass with a thickness of 1.9 mm. The input device DT has a piezoelectric thin plate 2 made of TDK-91A (Brand name) having a thickness of 200 μm, and an interdigital, transducer T made from aluminium thin film. The output device DR has a piezoelectric thin plate 2 and an interdigital transducer R having the same material and dimensions an the interdigital transducer T. The interdigital transducers T and R, whose types are normal, are mounted on each piezoelectric thin plate 2 which is cemented on the substrate 1 through an epoxy resin with a thickness of about 20 μm. Both the interdigital transducers T and R, consisting of ten finger pairs, respectively, have an interdigital periodicity of 640 μm and a center frequency of 5.1 MHz. If an electric signal with a frequency approximately equal to the center frequency of the interdigital transducer T is applied to the input device DT through the interdigital transducer T, the electric signal is converted to the acoustic wave, which is transmitted to the piezoelectric thin plate 2 on the substrate 1. Thus, it is possible to generate the acoustic wave of the first mode or higher on the substrate 1 effectively under low power consumption with low voltage. Furthermore, the phase velocity of the acoustic wave in the piezoelectric thin plate 2 is approximately equal to the propagation velocity of the surface acoustic wave on the substrate 1 for the embodiment in which a mono-layer medium is used. Therefore, it is possible not only to increase the transducer efficiency from the input electric signal to the acoustic wave, but also to remove the reflection generated by the mismatching of the acoustic impedance at the boundary surface between the piezoelectric thin plate 2 and the substrate 1. The acoustic wave, having a frequency approximately equal to the center frequency of the interdigital transducer R is converted to an electric signal, which is detected at the interdigital transducer R. Thus, the input device DT and the output device DR make an ultrasonic transducing system with a simple structure, where the interdigital transducers T and R are arranged to face each other to make a pair such that the transmitting direction of the acoustic wave from the interdigital transducer T is the same as the receiving direction thereof by the interdigital transducer R. When operating the ultrasonic touch system shown in FIG. 1, the acoustic wave generated on the substrate 1 between the interdigital transducer T and the interdigital transducer R is decreased in response to a touch with a finger or other things on the substrate 1 between the interdigital transducer T and the interdigital transducer R, thereby decreasing the electric signal detected at the interdigital transducer R. Accordingly, it is possible to sense a touch with a finger or other things on the substrate 1 with a high sensitivity and a quick response time.

Figure 2:
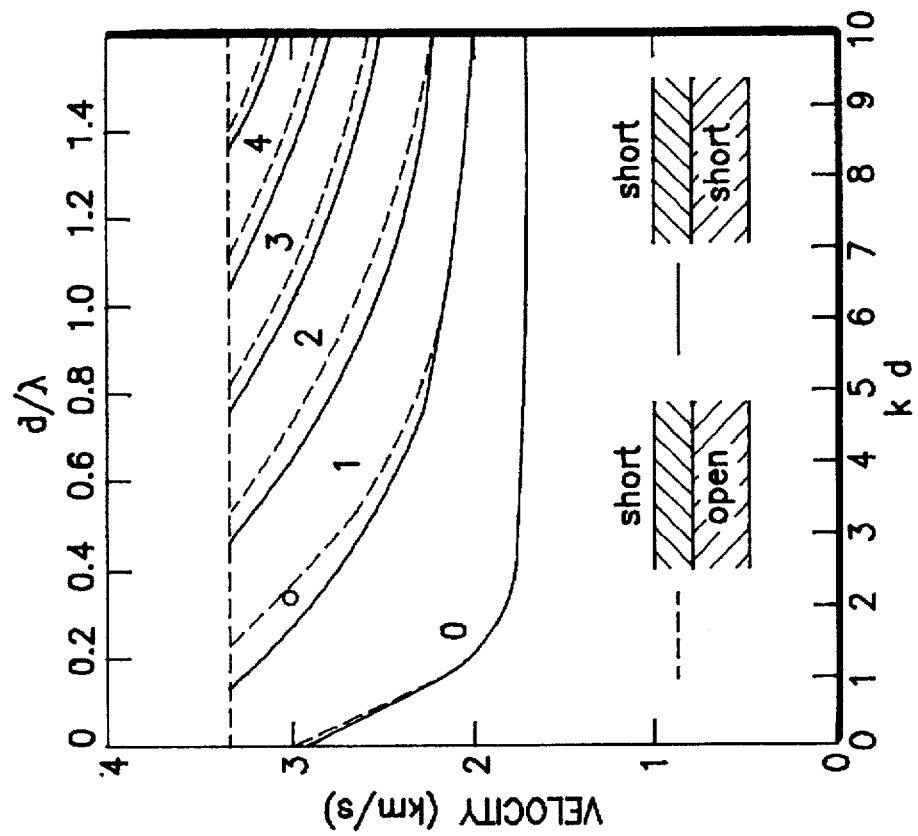
FIG. 2 shows the relationship between the phase velocity of the acoustic wave of each mode in the piezoelectric thin plate 2 and the kd value or the d/λ value.

FIG. 2 shows the relationship between the phase velocity of the acoustic wave of each mode in the piezoelectric thin plate 2 and the kd value or the d/λ value, the kd value being the product of the wave number k of the acoustic wave in the piezoelectric thin plate 2 and the thickness d of the piezoelectric thin plate 2, the d/λ value being the thickness d per the wavelength λ of the acoustic wave in the piezoelectric thin plate 2. The numbers in FIG. 2 correspond to the mode order, and the mark ○ shows the observed value. There are two types of the piezoelectric thin plate 2. One type of the piezoelectric thin plate 2 has one surface in contact with the substrate 1 and under an electrically opened condition, and the other surface coated with a metal thin layer making an electrically shorted condition. The other type of the piezoelectric thin plate 2 has both surfaces coated with metal thin layers, respectively, causing electrically shorted conditions at both surfaces. The acoustic wave in the piezoelectric thin plate 2 in the ultrasonic touch system shown in FIG. 1 has various modes. When the kd value is zero, the velocity of the 0-th mode acoustic wave in the piezoelectric thin plate 2 is coincident with the velocity of the acoustic wave on the substrate 1, which in this embodiment is a mono-layer medium. As the kd value becomes larger, the velocity of the 0-th mode acoustic wave in the piezoelectric thin plate 2 comes near the velocity of the acoustic wave in the piezoelectric thin plate 2, which in this embodiment is a mono-layer medium. There are the cut-off frequencies in the modes higher than the 0-th mode. Thus, when the kd value is lowest, the velocity of the acoustic wave of the higher mode in the piezoelectric thin plate 2 comes near the velocity of the side wave on the substrate 1 for a mono-layer medium.

Figure 3:
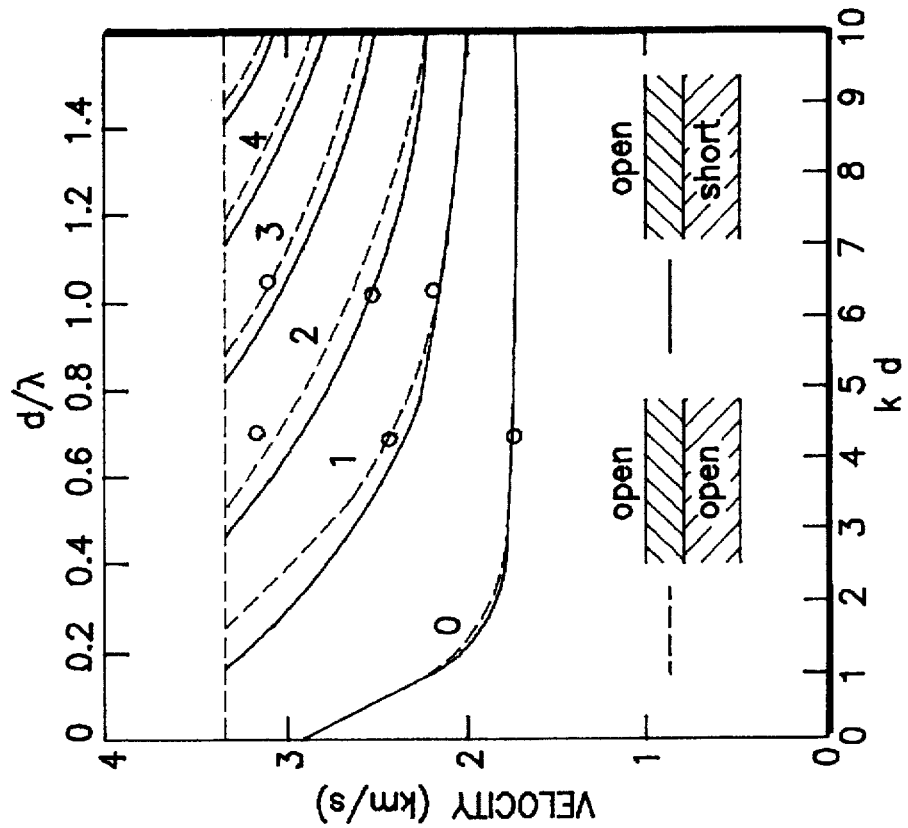
FIG. 3 shows the relationship between the phase velocity of the acoustic wave of each mode in the piezoelectric thin plate 2 and the kd value or the d/λ value.

FIG. 3 shows the relationship between the phase velocity of the acoustic wave of each mode in the piezoelectric thin plate 2 and the kd value or the d/λ value. The numbers in FIG. 3 correspond to the mode order, and the mark ○ shows the observed value. There are two types of the piezoelectric thin plate 2. One type of the piezoelectric thin plate 2 has each surface under an electrically opened condition. The other type of the piezoelectric thin plate 2 has one surface in contact with the substrate 2 and under an electrically shorted condition, and the other surface exposed to the air and under an electrically opened condition. When the kd value is zero, the velocity of the 0-th mode acoustic wave in the piezoelectric thin plate 2 is coincident with the velocity of the acoustic wave on the substrate 1, which in this embodiment is a mono-layer medium. As the kd value becomes larger, the velocity of the 0-th mode acoustic wave in the piezoelectric thin plate 2 comes near the velocity of the acoustic wave in the piezoelectric thin plate 2 which in this embodiment is a mono-layer medium. There are the cut-off frequencies in the modes higher than the 0-th mode. Thus, when the kd value is lowest, the velocity of the acoustic wave of the higher mode in the piezoelectric thin plate 2 comes near the velocity of the shear wave on the substrate 1 for a mono-layer medium.

Figure 4:
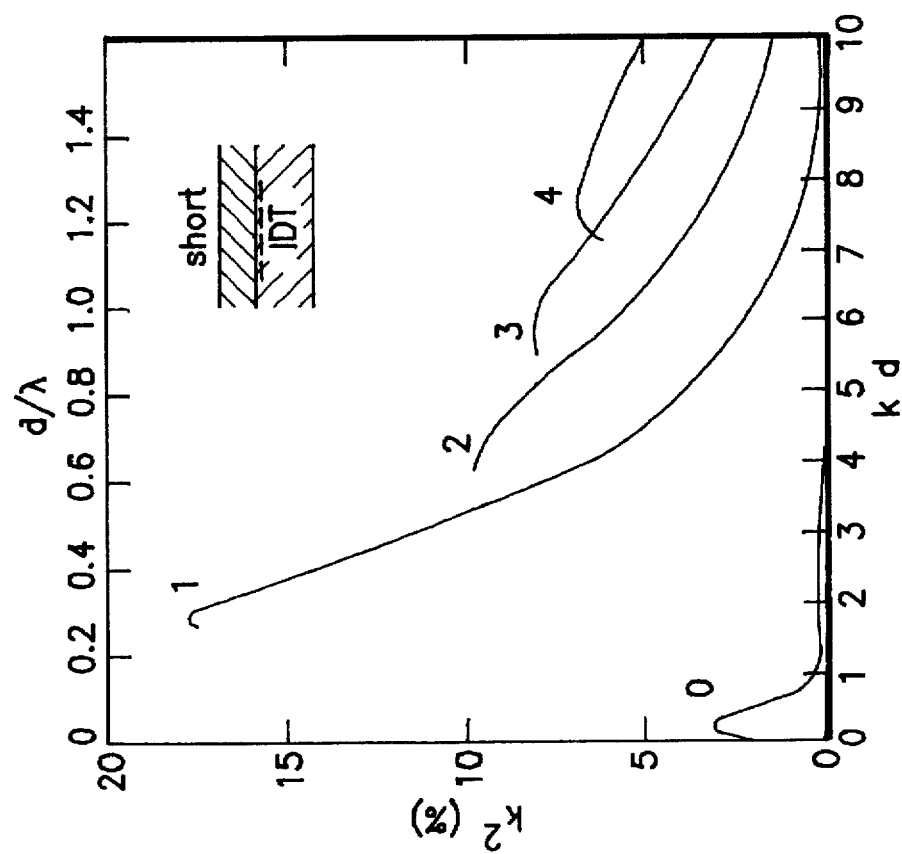
FIG. 4 shows the relationship between the kd value or the d/λ value, and the electromechanical coupling constant $k^2$.

FIG. 4 shows the relationship between the kd value or the d/λ value, and the electromechanical coupling constant $k^2$ calculated from the difference between the phase velocities for electrically opened and shorted conditions, respectively. The numbers in FIG. 4 correspond to the mode order. The piezoelectric thin plate 2 has one surface, being in contact with the substrate 1 and having the interdigital transducer (IDT) T, and the other surface under an electrically shorted condition. The $k^2$ value of the higher mode acoustic wave is larger than that of the 0-th mode acoustic wave. Particularly, when the kd value of the first mode acoustic wave is 1.8, the $k^2$ value is 17.7%, showing the maximum value.

Figure 5:
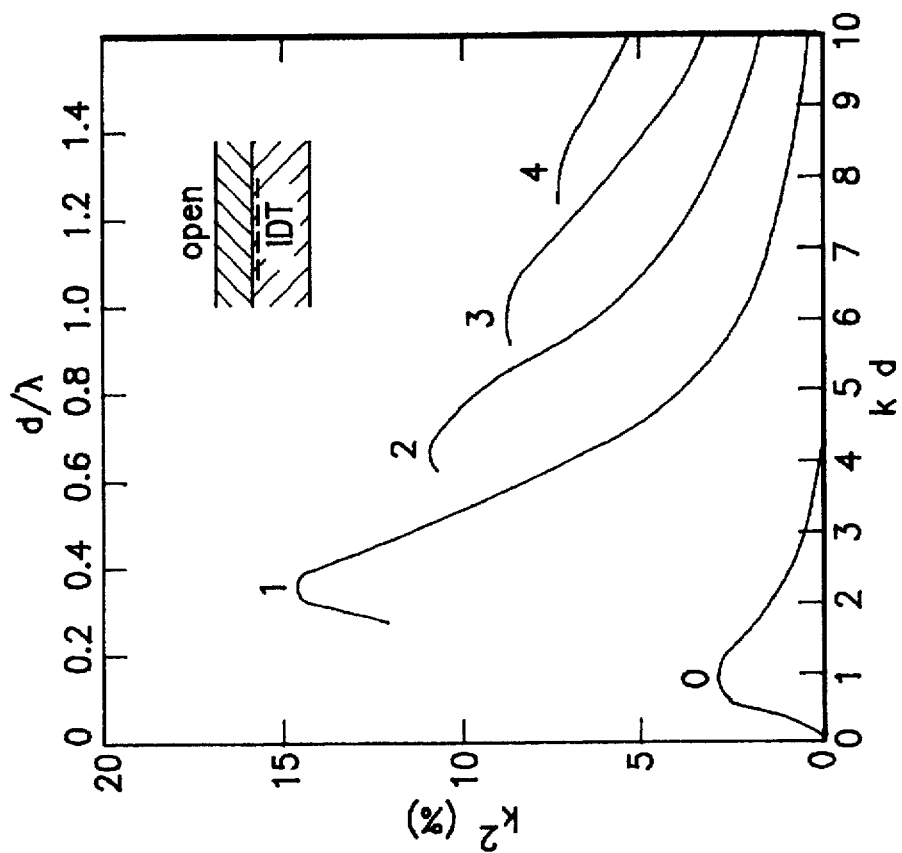
FIG. 5 shows the relationship between the $k^2$ value and the kd value or the d/λ value.

FIG. 5 shows the relationship between the $k^2$ value and the kd value or the d/λ value. The numbers in FIG. 5 correspond to the mode order. The piezoelectric thin plate 2 has one surface being in contact with the substrate 1 and having the interdigital transducer T, and the other surface exposed to the air and under electrically opened condition. The $k^2$ value of the higher mode acoustic wave is larger than that of the 0-th mode acoustic wave.

Figure 6:
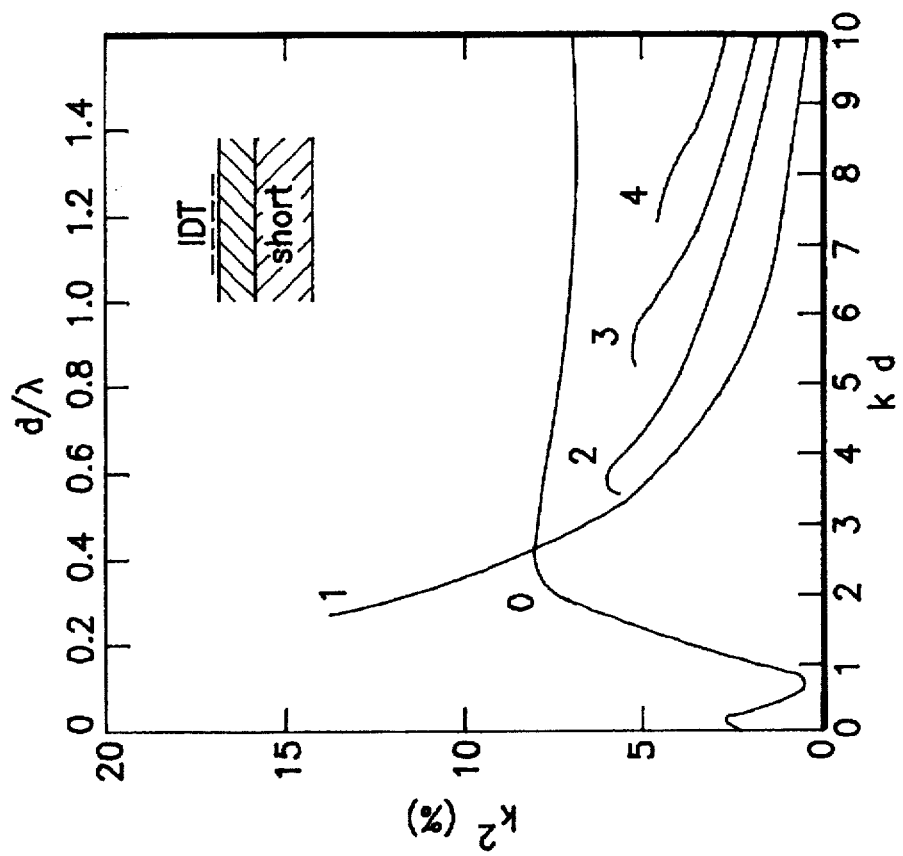
FIG. 6 shows the relationship between the $k^2$ value and the kd value or the d/λ value.

FIG. 6 shows the relationship between the $k^2$ value and the kd value or the d/λ value. The numbers in FIG. 6 correspond to the mode order. The piezoelectric thin plate 2 has one surface in contact with the substrate 1 and under an electrically shorted condition, and the other surface having the interdigital transducer T.

Figure 7:
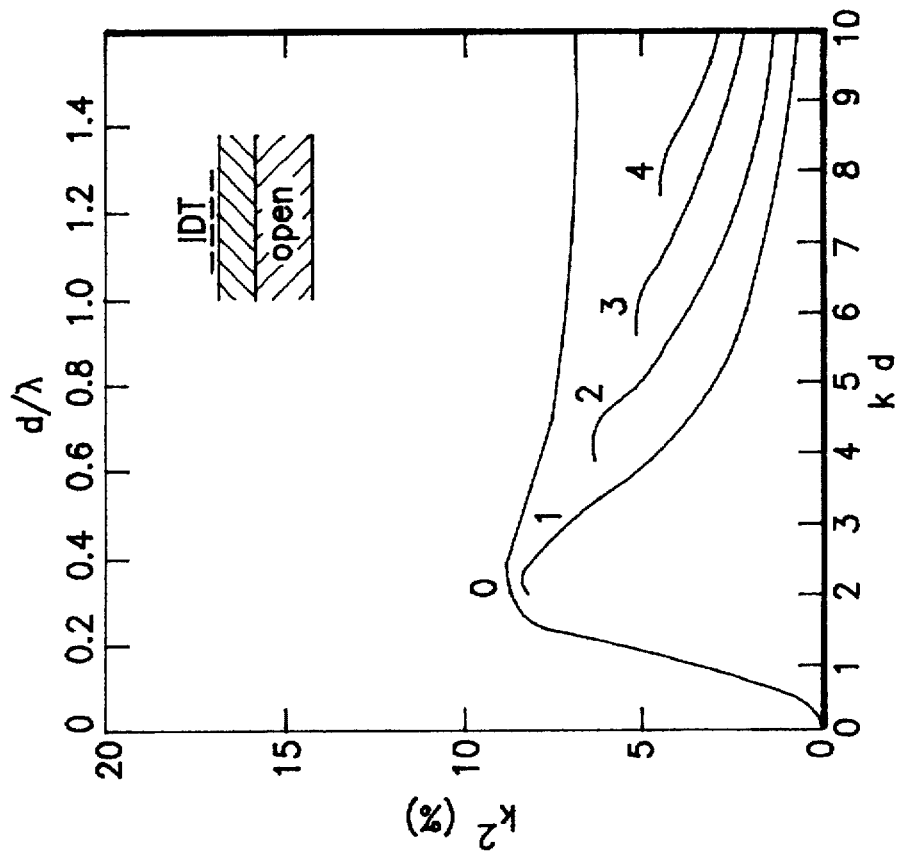
FIG. 7 shows the relationship between the $k^2$ value and the kd value or the d/λ value.

FIG. 7 shows the relationship between the $k^2$ value and the kd value or the d/λ value. The numbers in FIG. 7 correspond to the mode order. The piezoelectric thin plate 2 has one surface in contact with the substrate 1 and under an electrically opened condition, and the other surface having the interdigital transducer T.

It is clear from FIG. 2 to FIG. 7 that the $k^2$ value is maximum when the phase velocity of the acoustic wave of the first mode or the higher modes in the piezoelectric thin plate 2 is coincident with the velocity of the acoustic wave on the substrate 1 for a mono-layer medium.

It is also clear from FIG. 4 to FIG. 7 that the transducer efficiency of the electric energy, applied to the interdigital transducer T, to the acoustic wave is increased, when the piezoelectric thin plate 2 has one surface contact with the substrate 1 and having the interdigital transducer T, and the other surface under an electrically shorted condition.

When generating the acoustic wave on the substrate 1 in the ultrasonic touch system shown in FIG. 1, it is necessary to consider the reflection generated by the mismatching of the acoustic impedance at the boundary surface between the piezoelectric thin plate 2 and the substrate 1. In order to make the reflection coefficient minimum, it is necessary to design the ultrasonic touch system such that the phase velocity of the acoustic wave in the piezoelectric thin plate 2 is coincident with the velocity of the surface acoustic wave on the substrate 1 which exists as a mono-layer medium, or such that the d/λ value becomes small. If the d value is constant, the acoustic wave of the first mode is available in comparison with the second mode, the second mode being available in comparison with the third mode. After all, when the d value is less than the interdigital periodicity of the interdigital transducer and the interdigital periodicity is approximately equal to the wavelength of the acoustic wave of the first mode or the higher modes, it is possible not only to increase the transducer efficiency of the electric energy, applied to the interdigital transducer T, to the acoustic wave, but also to remove the reflection generated by the mismatching of the acoustic impedance at the boundary surface between the piezoelectric thin plate 2 and the substrate 1.

When the piezoelectric thin plate 2 comprises a piezoelectric ceramic, where the directions of the polarization axis and the thickness run parallel with each other, the acoustic wave of the first mode or the higher modes can be generated on the substrate 1 effectively.

When the piezoelectric thin plate 2 comprises a piezoelectric thin film made from highly polymerized compound such as PVDF and so on, the acoustic wave of the first mode or the higher modes can be generated on the substrate 1 effectively.

When the substrate 1 comprises an acrylate plate or other highly polymerized compound having transparency, the acoustic wave can be generated on the substrate 1 effectively. When the piezoelectric thin plate 2 comprises a single crystal, such as $LiNbO_3$ or $LiTaO_3$, the acoustic wave can be generated on the substrate 1 effectively.

Figure 8:
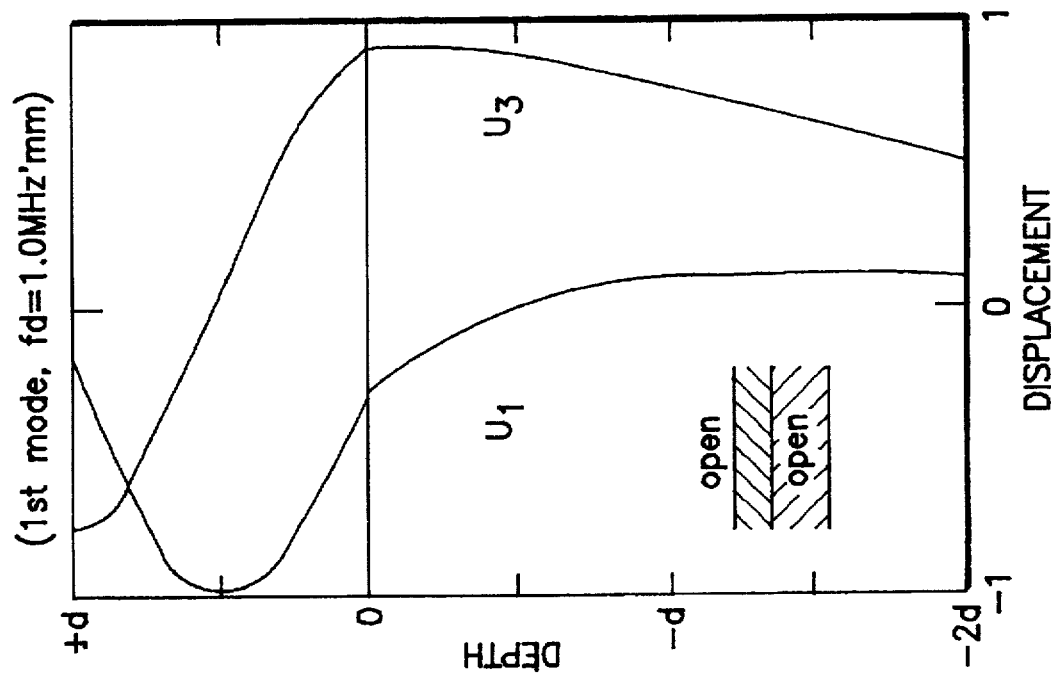
FIG. 8 shows the relationship between the displacement and the depth under the fd value of 1.0 MHz.mm, corresponding to the nearly maximum $k^2$ value in the first mode acoustic wave.

FIG. 8 shows the relationship between the displacement and the depth under the fd value of 1.0 MHz.mm, corresponding to the nearly maximum $k^2$ value in the first mode acoustic wave. The fd value is the product of the frequency of the acoustic wave in the piezoelectric thin plate 2 and the d value. The piezoelectric thin plate 2 has both surfaces under electrically opened conditions. $U_1$ and $U_3$ in FIG. 8 show a parallel component and a perpendicular component of the displacement, respectively. The displacement is normalized by the maximum value. The depth of zero shows the boundary face between the piezoelectric thin plate 2 and the substrate 1. Both the displacement $U_1$ and $U_3$ are normalized by the maximum value, $(U_1^2+U_3^2)^{1/2}$. The ratio of the displacement component of the first mode acoustic wave on the substrate 1 is 58%.

Figure 9:
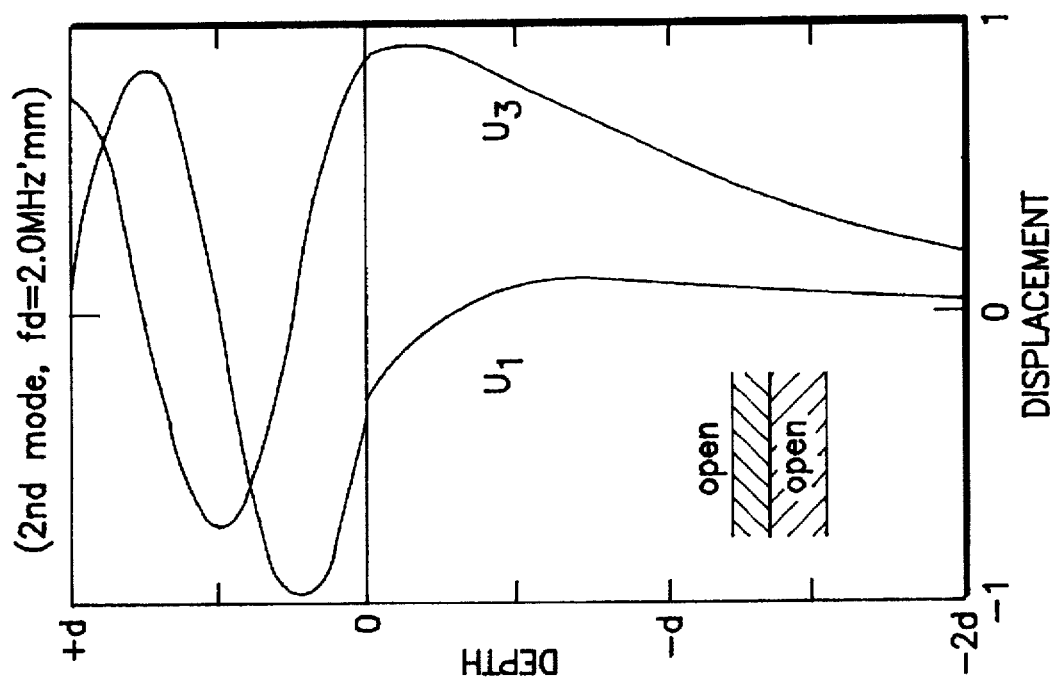
FIG. 9 shows the relationship between the displacement and the depth under the fd value of 2.0 MHz.mm, corresponding to the nearly maximum $k^2$ value in the second mode acoustic wave.

FIG. 9 shows the relationship between the displacement and the depth under the fd value of 2.0 MHz.mm, corresponding to the nearly maximum $k^2$ value in the second mode acoustic wave. The piezoelectric thin plate 2 has both surfaces under electrically opened conditions. The ratio of the displacement component of the second mode acoustic wave on the substrate 1 is 52%.

Figure 10:
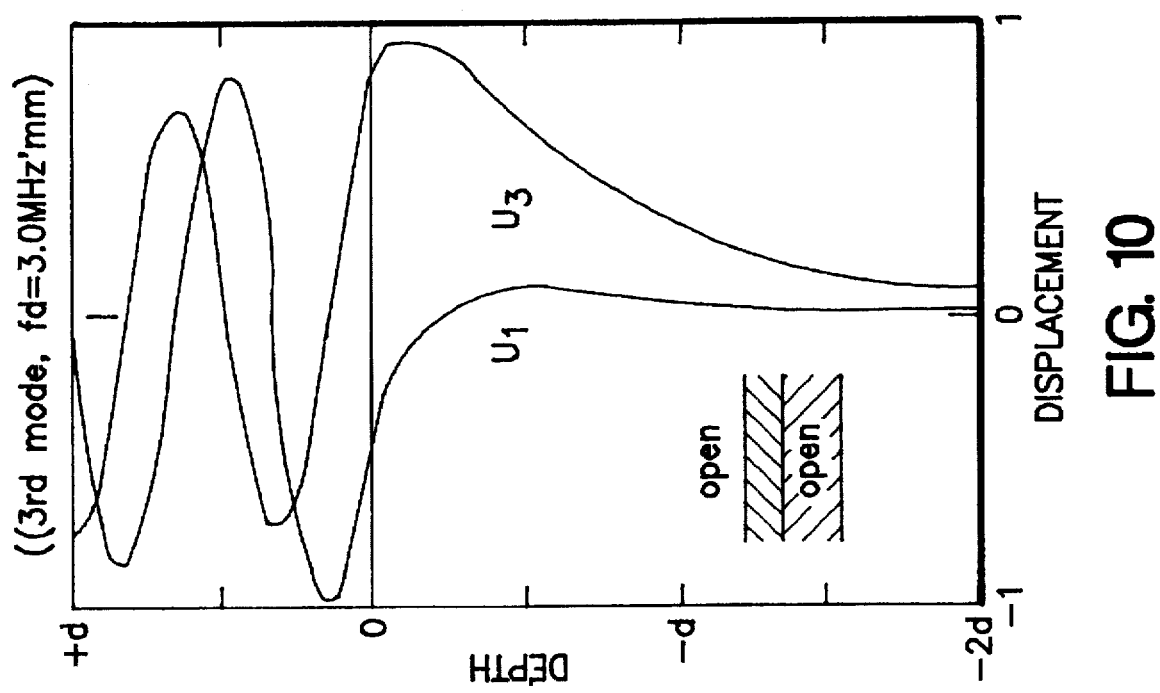
FIG. 10 shows the relationship between the displacement and the depth under the fd value of 3.0 MHz.mm, corresponding to the nearly maximum $k^2$ value in the third mode acoustic wave.

FIG. 10 shows the relationship between the displacement and the depth under the fd value of 3.0 MHz.mm, corresponding to the nearly maximum $k^2$ value in the third mode acoustic wave. The piezoelectric thin plate 2 has both surfaces under electrically opened conditions. The ratio of the displacement component of the third mode acoustic wave on the substrate 1 is 47%.

Figure 11:
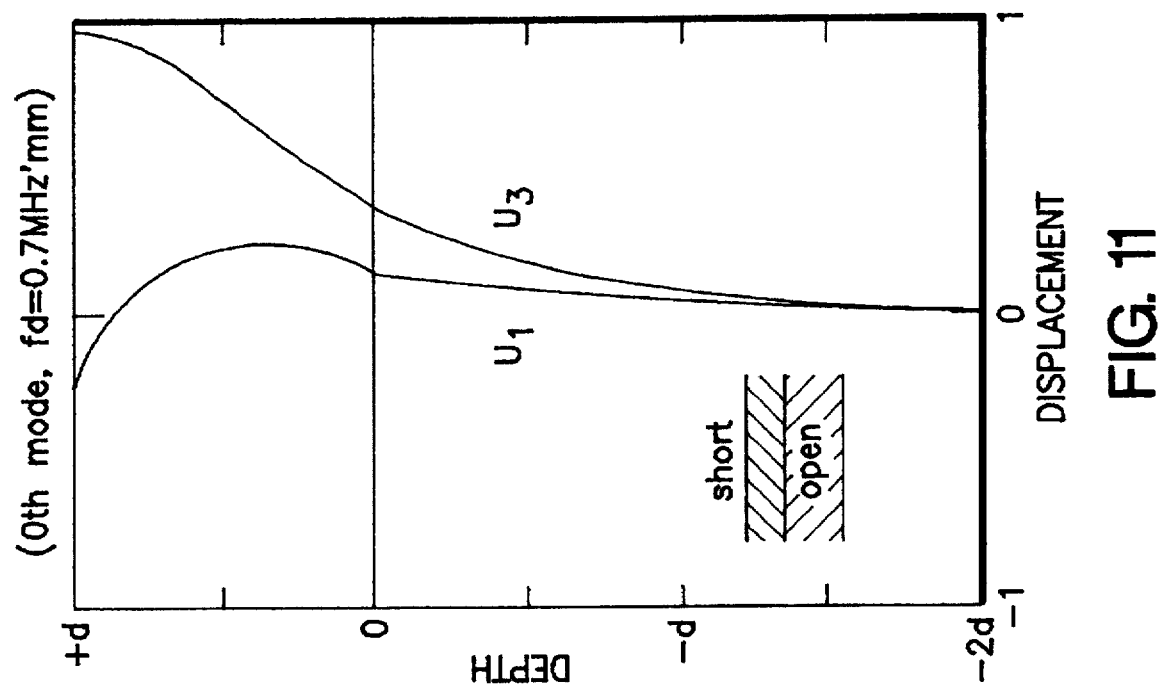
FIG. 11 shows the relationship between the displacement and the depth under the fd value of 0.7 MHz.mm in the 0-th mode acoustic wave.

FIG. 11 shows the relationship between the displacement and the depth under the fd value of 0.7 MHz.mm in the 0-th mode acoustic wave. The piezoelectric thin plate 2 has one surface, being in contact with the substrate 1 and under an electrically opened condition, and the other surface, having the interdigital transducer and under an electrically shorted condition. The 0-th mode acoustic wave, concentrated near the surface of the piezoelectric thin plate 2, comes near the acoustic wave in the piezoelectric thin plate 2 which exists as a mono-layer medium.

Figure 12:
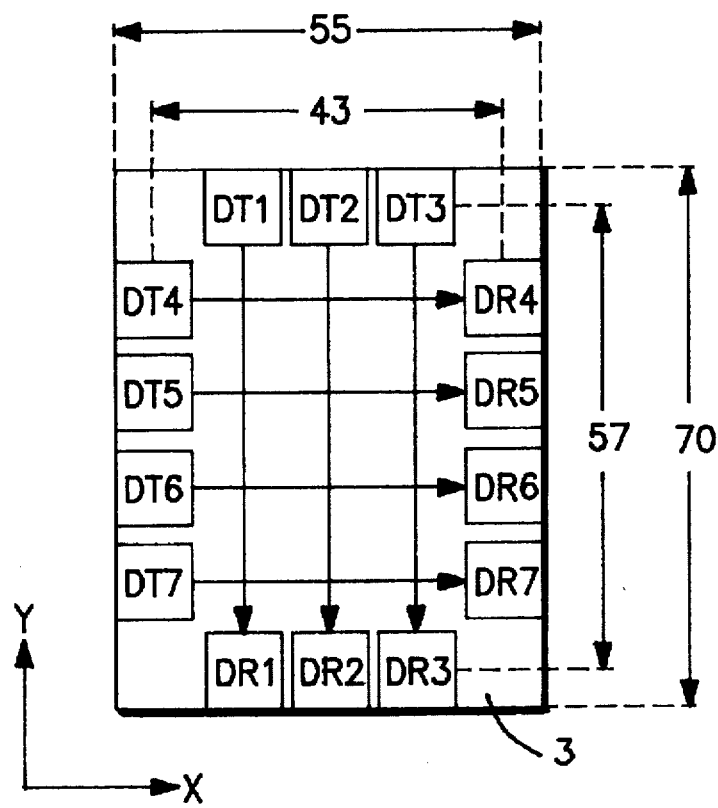
FIG. 12 shows a plan view of the ultrasonic touch system according to a second embodiment of the present invention.

It is clear from FIG. 8 to FIG. 11 that the acoustic wave of the first mode or the higher modes is available in order to generate the acoustic wave on the substrate 1, because the acoustic wave of the mode, where the ratio of the displacement component of the acoustic wave on the substrate 1 is large, is available FIG. 12 shows a plan view of an ultrasonic touch system according to a second embodiment of the present invention. The ultrasonic touch system comprises seven input devices, DT1, DT2, DT3, DT4, DT5, DT6 and DT7, seven output devices DR1, DR2, DR3, DR4, DR5, DR6 and DR7, and a substrate 3 made from a pyrex glass with dimensions of 70 mm in length, 55 mm in width and 1.9 mm in thickness. Both the seven input devices and the seven output devices are made from the same piezoelectric materials, and have the same functions as well as the same construction. If an electric signal is applied to each input device, the electric signal is converted to the acoustic wave, which is transmitted to the substrate 3. The acoustic wave on the substrate 3 is converted to an electric signal again, the electric signal being detected at each output device corresponding to each input device. For example, an electric signal applied to the input device DT1 is converted to the acoustic wave, which is detected at the output device DR1 as an electric signal. Thus the seven input devices and the seven output devices make seven ultrasonic transducing systems classified into two groups, one group including the input devices, DT1, DT2 and DT3, and the output devices, DR1, DR2 and DR3, the other group including the input devices, DT4, DT5, DT6 and DT7, and the output devices, DR4, DR5, DR6 and DR7. Moreover, the propagation direction of the acoustic wave on the substrate 3 in the one group is perpendicular to that in the other group.

Figure 13:
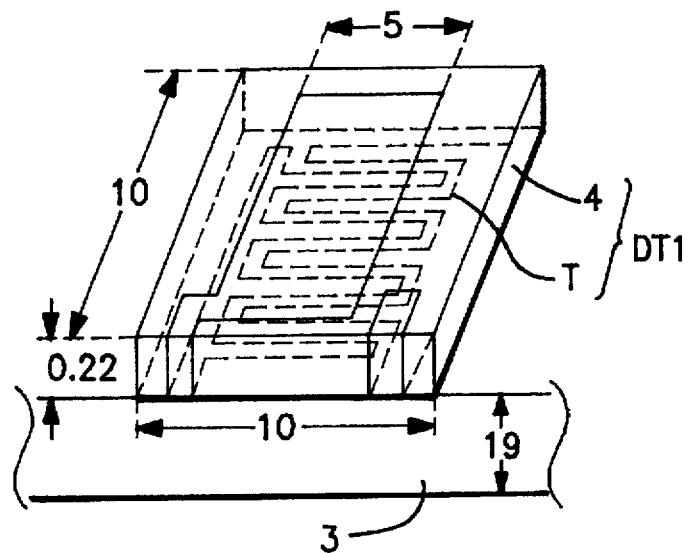
FIG. 13 shows a perspective view of the input device DT1 seen in FIG. 12.

FIG. 13 shows a perspective view of the input device DT1 seen in FIG. 12. The input device DT1 has a piezoelectric thin plate 4, of which material is TDK-91A (Brand name), having dimensions of 10 mm in length, 10 mm in width and 220 μm in thickness, and an interdigital transducer T made from aluminium thin film. The interdigital transducer T, whose type is normal, is mounted on the piezoelectric thin plate 4 which is cemented on the substrate 3 through an epoxy resin with thickness of about 20 μm. The interdigital transducer T consisting of ten finger pairs has an interdigital periodicity of 640 μm and an overlap length of 5 mm. Another input devices and the output devices have the same constructions as the input device DT1.

If an electric signal with a frequency approximately equal to the center frequency of each input interdigital transducer in the ultrasonic touch system shown in FIG. 12 is applied to each input device through each input interdigital transducer, the electric signal is converted to the acoustic wave, which is transmitted to the piezoelectric thin plate 4 on the substrate 3. The acoustic wave, having a frequency approximately equal to the center frequency of each output interdigital transducer is converted to an electric signal, which is detected at the output interdigital transducer. When the thickness of the piezoelectric thin plate 4 is less than the interdigital periodicity of each interdigital transducer, and the interdigital periodicity of each interdigital transducer is approximately equal to the wavelength of the acoustic wave of the first mode or the higher modes, the acoustic wave of the first mode or the higher modes is generated on the substrate 3. At this time, if the phase velocity of the acoustic wave in the piezoelectric thin plate 4 is approximately equal to the propagation velocity of the surface acoustic wave on the substrate 3 which in this embodiment exists as a monolayer medium, it is possible not only to increase the transducer efficiency of the electric energy, applied to the input interdigital transducers, to the acoustic wave, but also to remove the reflection generated by the mismatching on the acoustic impedance at the boundary surface between the piezoelectric thin plate 4 and the substrate 3. Thus, it is possible to generate the acoustic wave on the substrate 3 effectively under low power consumption with low voltage.

When the piezoelectric thin plate 4 comprises a piezoelectric ceramic, where the directions of the polarization axis and the thickness run parallel with each other, the acoustic wave of the first mode or the higher modes can be generated on the substrate 3 effectively.

When the piezoelectric thin plate 4 comprises a piezoelectric thin film made from highly polymerized compound such as PVDF and so on, the acoustic wave of the first mode or higher can be generated on the substrate 3 effectively.

When the substrate 3 comprises an acrylate plate or other highly polymerized compound having transparency, the acoustic wave can be generated on the substrate 3 effectively. When the piezoelectric thin plate 4 comprises a single crystal, such as $LiNbO_3$ or $LiTaO_3$, the acoustic wave can be generated on the substrate 3 effectively.

When operating the ultrasonic touch system shown in FIG. 12, the acoustic wave propagating in the substrate 3 is decreased in response to a touch with a finger or other things thereon. The acoustic wave on the junction of two propagation directions, of which, for example, one is the area between the input device DT1 and the output device DR1 and the other is the area between the input device DT4 and the output device DR4, is decreased in response to a touch with a finger or other things thereon. Therefore, the electric signals detected at the corresponding output interdigital transducers are also decreased. Accordingly, it is possible to sense a touch with a finger or other things on the substrate 3 with a high sensitivity and a quick response time. In addition, the touched position can be specified from the output interdigital transducers, where the electric signal is decreased. At this time, if there are more ultrasonic transducing systems, of which each comprises a pair of input and output devices such as the input device DT1 and the output device DR1, the touched position can be specified more clearly.

Figure 14:
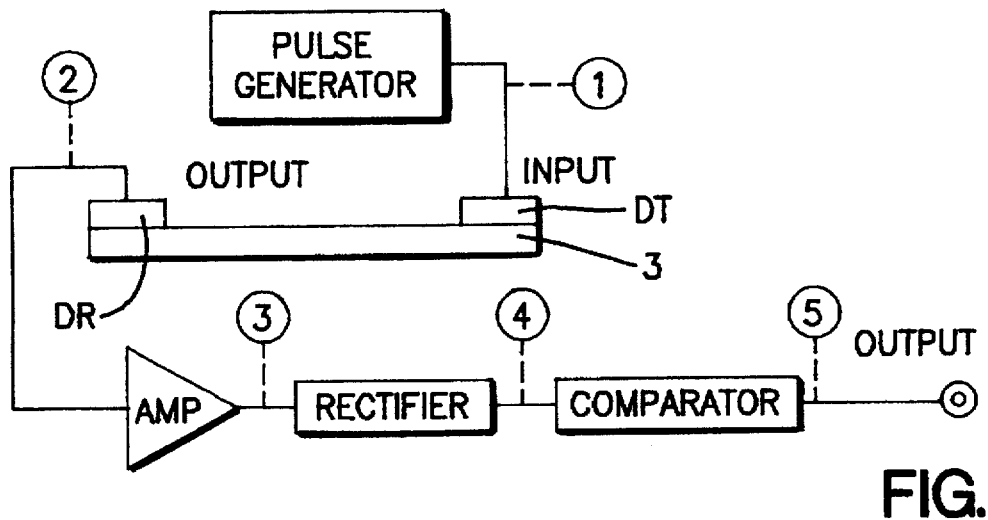
FIG. 14 shows a schematic illustration of the ultrasonic touch system, shown in FIG. 12, under an rf pulse operation.

FIG. 14 shows a schematic illustration of the ultrasonic touch system, shown in FIG. 12, under an rf pulse operation. If an rf pulse ① is applied to the input device through the interdigital transducer DT, an electric signal ② is detected at the output interdigital transducer DT, and the electric signal ② is amplified via an amplifier. An electric signal ③ detected at the amplifier is converted to a direct current voltage ④ via a voltage doubling rectifier. At this time, the direct current voltage ④ in case of touching on the substrate 3 is different from that in case of untouching thereon. In short, there are two kinds of the direct current voltages ④. By means of setting the threshold voltage at a proper level, it is possible to set the two direct current voltages ④ at the two fixed values ⑤ in a comparator, respectively. Thus, the voltage ⑤ in case of touching on the substrate 3 is 0 V, and the voltage ⑤ in case of untouching thereon is 5 V.

Figure 15:
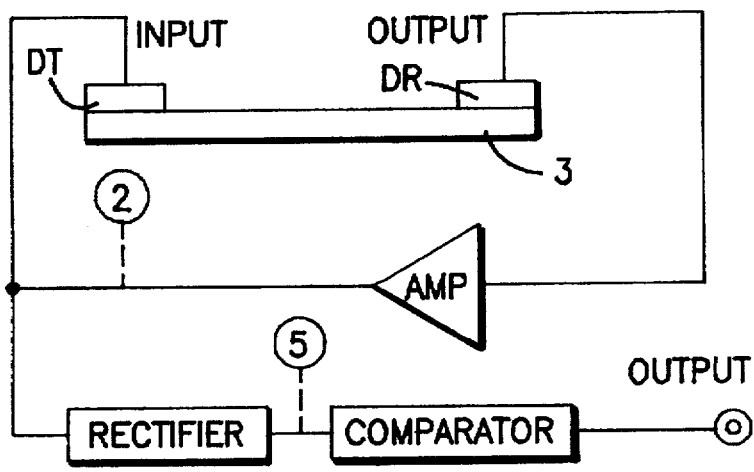
FIG. 15 shows a schematic illustration of the ultrasonic touch system, shown in FIG. 12, under an operation with a delay line oscillator.

FIG. 15 shows a schematic illustration of the ultrasonic touch system, shown in FIG. 12, under an operation with a delay line oscillator. If an electric signal is applied to the input device through the interdigital transducer DT, an electric signal is detected at the output interdigital transducer DR and is amplified via an amplifier. An electric signal ① detected at the amplifier is converted to a direct current voltage ② via a voltage doubling rectifier. At this time, the direct current voltage ② in case of touching on the substrate 3 is different from that in case of untouching thereon. In short, there are two kinds of the direct current voltages ②. By means of setting the threshold voltage at a proper level, it is possible to set the two kinds of the direct current voltages ② at the fixed values, respectively. The operation with the delay line oscillator does not require the pulse generator. Therefore, it is possible to provide the ultrasonic touch system with a smaller size which is very light in weight and has a simple structure.

Figure 16:
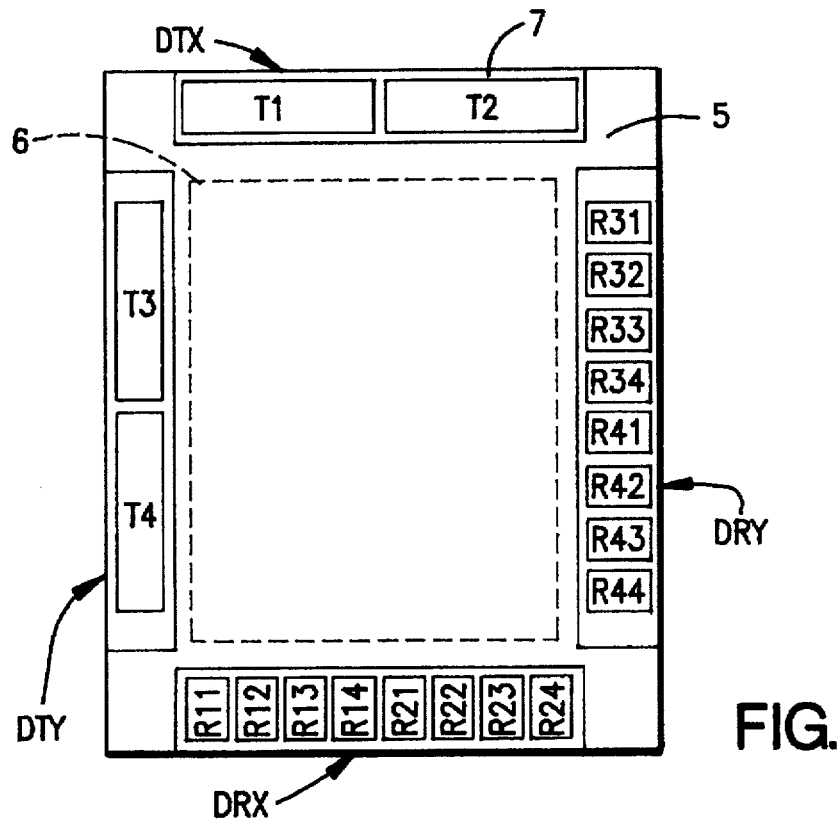
FIG. 16 shows a plan view of the ultrasonic touch system according to a third embodiment of the present invention.

FIG. 16 shows a plan view of an ultrasonic touch system according to a third embodiment of the present invention. The ultrasonic touch system comprises two input devices DTX and DTY, two output devices DRX and DRY, a substrate 5 made from a pyrex glass with dimensions of 70 mm in length, 55 mm in width and 1.9 mm in thickness, and a display face 6 included in a display device, the position of display face 6 being shown in dashed lines in FIG. 16. The input device DTX has a piezoelectric thin plate 7, of which material is TDK-101A (Brand name), having a dimension of 230μm in thickness, and two interdigital transducers T1 and T2 made from aluminium thin film, respectively. The input device DTY has a piezoelectric thin plate 7 and two interdigital transducers T3 and T4 made from aluminium thin film, respectively. The output device DRX has a piezoelectric thin plate 7 and eight interdigital transducers, R11, R12, R13, R14, R21, R22, R23 and R24, made from aluminium thin film, respectively. The output device DRY has a piezoelectric thin plate 7 and eight interdigital transducers, R31, R32, R33, R34, R41, R42, R43 and R44, made from aluminium thin film, respectively. Each interdigital transducer, whose type is normal, is mounted on each piezoelectric thin plate 7 which is cemented on one surface of the substrate 5 through an epoxy resin with thickness of about 20 μm. The display face 6 is mounted on the other surface, without the input and output devices, of the substrate 5. Each interdigital transducer consisting of 7.5 finger pairs has an interdigital periodicity of 640 μm.

Figure 17A:
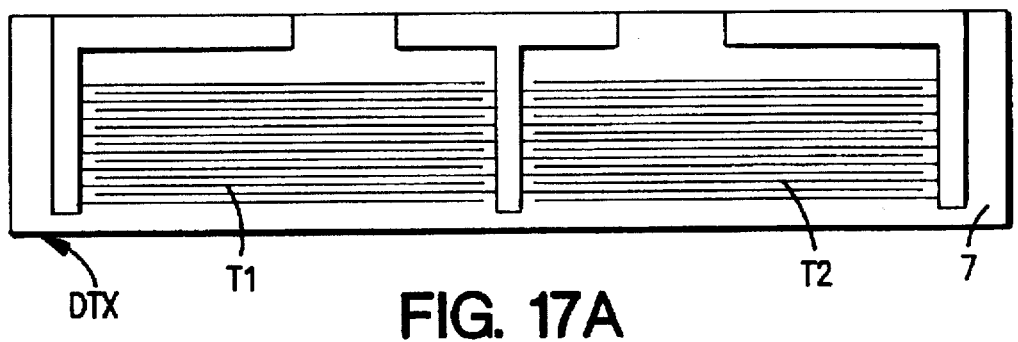
FIG. 17 shows a plan view of the input device DTX and the output device DRX in the ultrasonic touch system shown in FIG. 16.
Figure 17B:
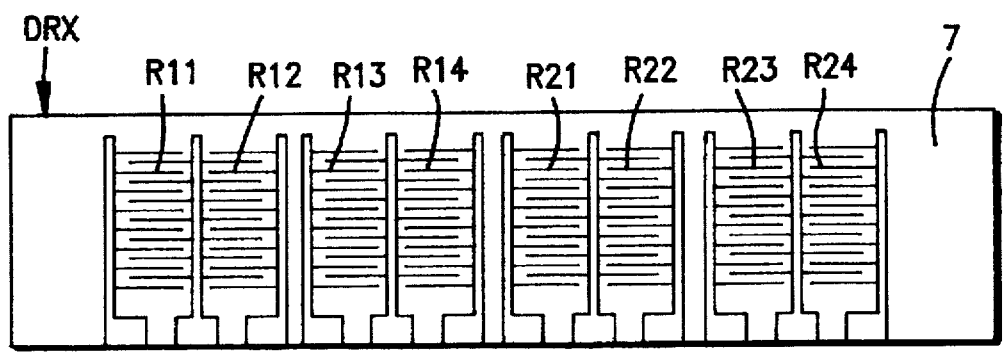

FIG. 17 shows a plan view of the input device DTX and the output device DRX in the ultrasonic touch system shown in FIG. 16. The input device DTX and the output device DRX are placed at the opposite ends. In the same way, the input device DTY and the output device DRY are placed at the opposite ends. The interdigital transducers, T1, T2, T3 and T4, have an overlap length of 18 mm, respectively. The interdigital transducers, R11, R12, R13, R14, R21, R22, R23, R24, R31, R32, R33, R34, R41, R42, R43 and R44, have an overlap length of 2.7 mm, respectively. The interdigital transducers, R11, R12, R13 and R14, are corresponding to the interdigital transducer T1. The interdigital transducers, R21, R22, R23 and R24, are corresponding to the interdigital transducer T2. The interdigital transducers, R31, R32, R33 and R34, are corresponding to the interdigital transducer T3. The interdigital transducers, R41, R42, R43 and R44, are corresponding to the interdigital transducer T4.

If an electric signal is applied to the input devices DTX and DTY of the ultrasonic touch system shown in FIG. 16, the acoustic wave is generated on the substrate 5. The acoustic wave is converted to an electric signal which is detected at the output devices DRX and DRY. Thus, the two input devices and the two output devices make sixteen ultrasonic transducing systems classified into two groups, one group including the input device DTX and the output device DRX, the other group including the input device DTY and the output device DRY. Moreover, the propagation direction of the acoustic wave on the substrate 5 in the one group is perpendicular to that in the other group.

When the thickness of the piezoelectric thin plate 7 seen in FIG. 16 is less than the interdigital periodicity of each interdigital transducer, and the interdigital periodicity of each interdigital transducer is approximately equal to the wavelength of the acoustic wave of the first mode or the higher modes, the acoustic wave of the first mode or the higher modes is generated on the substrate 5. At this time, if the phase velocity of the acoustic wave in the piezoelectric thin plate 7 is approximately equal to the propagation velocity of the surface acoustic wave on the substrate 5 which exists as a mono-layer medium, in this embodiment, it is possible not only to increase the transducer efficiency of the electric energy, applied to the input interdigital transducers, to the acoustic wave, but also to remove the reflection generated by the mismatching and others on the acoustic impedance at the boundary surface between the piezoelectric thin plate 7 and the substrate 5. Thus, it is possible to generate the acoustic wave on the substrate 5 effectively under low power consumption and low voltage.

When the piezoelectric thin plate 7 comprises a piezoelectric ceramic, where the directions of the polarization axis and the thickness run parallel with each other, the acoustic wave of the first mode or higher can be generated on the substrate 5 effectively.

When the piezoelectric thin plate 7 comprises a piezoelectric thin film made from highly polymerized compound such as PVDF and so on, the acoustic wave of the first mode or higher can be generated on the substrate 5 effectively.

When the substrate 5 comprises an acrylate plate or other highly polymerized compound having transparency, the acoustic wave can be generated on the substrate 5 effectively. When the piezoelectric thin plate 7 comprises a single crystal, such as $LiNbO_3$ or $LiTaO_3$, the acoustic wave can be generated on the substrate 5 effectively.

When inserting the ultrasonic touch system according to the present invention into a display in a computer and so on, the substrate of the ultrasonic touch system is set up such that the surface having the input and output devices is faced outside, moreover such that only the area surrounded with the input and output devices on the surface is exposed to outside.

FIG. 18(a) shows a plan view of an interdigital transducer taking the place of that seen in FIG. 16. There are two interdigital periodicities shown in FIG. 18(a), the overlap length of the first being different from that of the second. One consists of five finger pairs with an interdigital periodicity of 620 µm, the other consists of five finger pairs with an interdigital periodicity of 295 µm. When these interdigital transducers are employed, they are placed such that the parts consisting of five finger pairs with the interdigital periodicity of 295 µm are closest to each other in corresponding pairs of transducers, because the acoustic wave with a higher frequency generated on the substrate 5 smaller is more highly attenuated on the substrate 5. Thus, the interdigital transducers are placed such that the part with a smaller interdigital periodicity has a smaller propagation distance of the acoustic wave. The arrangement such that the finger pairs with a smaller interdigital periodicity are closest to each other reduces the attenuation of the acoustic wave on the substrate 5.

FIG. 18(b) shows a plan view of an interdigital transducer taking the place of that seen in FIG. 16. The interdigital transducer has interdigital periodicities with hyperbolical variation along the direction of the electrode finger located at the central part of the interdigital transducer. The interdigital transducer consists of 26.5 finger pairs with interdigital periodicities of 260 µm–390 µm, the overlap length being 23.4 mm. When the interdigital transducers are employed, they take the symmetrical positions each other against the center line between the two interdigital transducers. In the above device configuration, the operation frequency is in the range from 5.4 MHz to 8.2 MHz.

Figure 19:
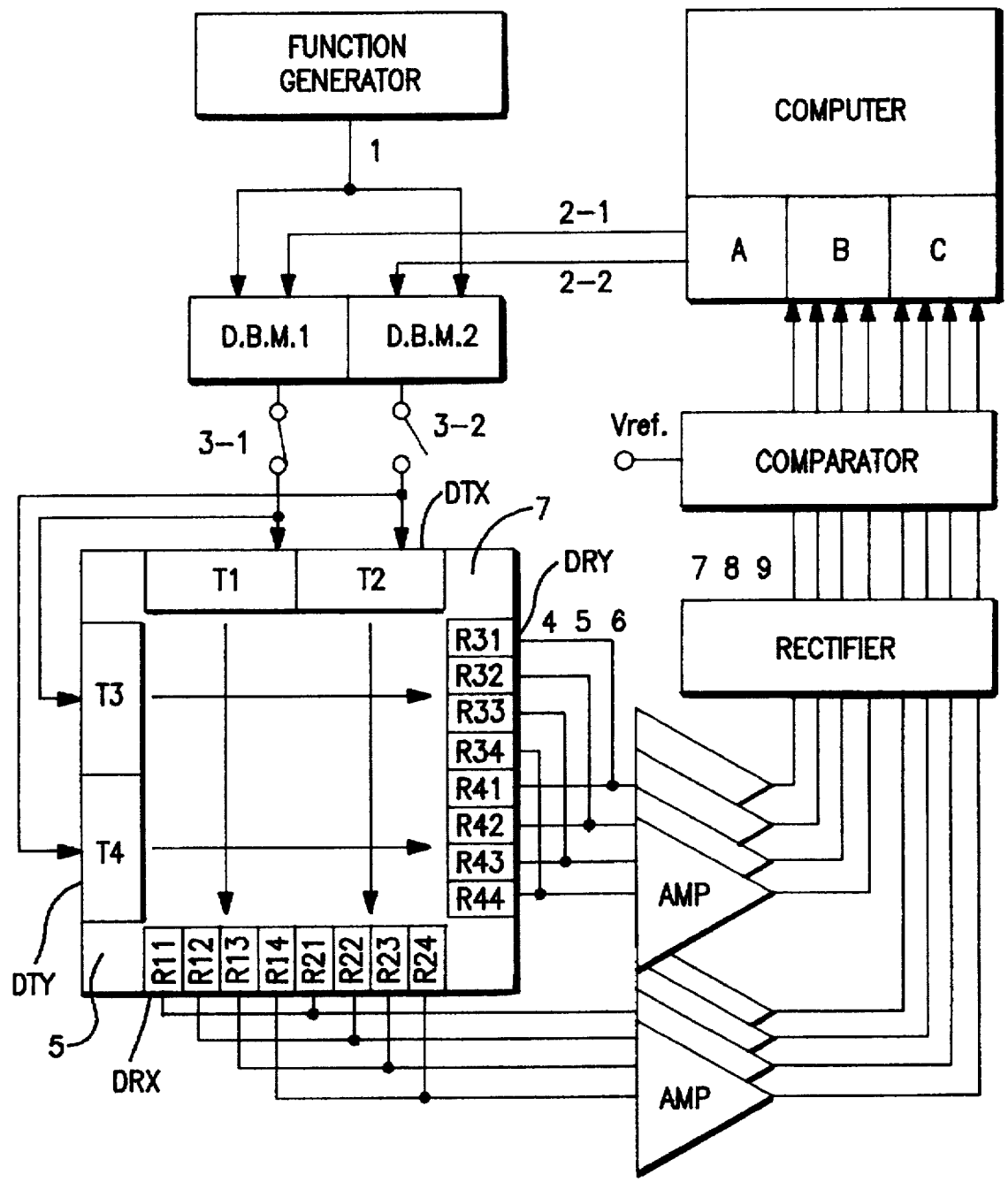
FIG. 19 shows a schematic illustration of the ultrasonic touch system, shown in FIG. 16, under an rf pulse operation.
Figure 20:
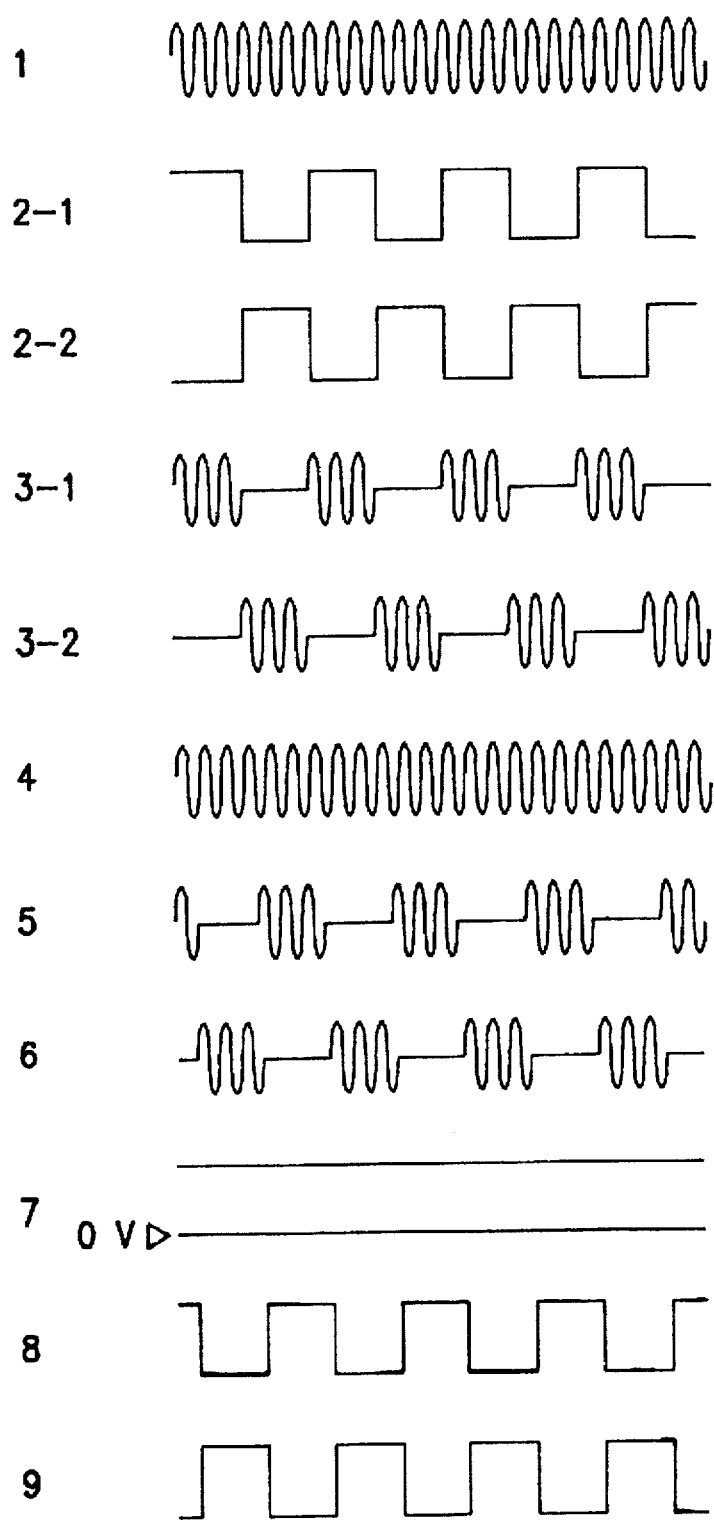
FIG. 20 shows the waveforms corresponding to the respective parts, ①–⑨, seen in FIG. 19.

FIG. 19 shows a schematic illustration of the ultrasonic touch system, shown in FIG. 16, under an rf pulse operation. FIG. 20 shows the waveforms corresponding to the respective parts, ①–⑨, seen in FIG. 19. When operating the ultrasonic touch system shown in FIG. 16, a continuous wave ① generated by a function generator is modulated to rf pulses ③ -1 and ③ -2 in the corresponding double balanced mixers (DBMs) 1 and 2 by the corresponding clock pulses ② -1 and ② -2 from a computer. The DBM 1 and the DBM 2 play a role of switching to apply with an rf pulse to the interdigital transducers T1 and T3 (T1 group of IDTs) or the interdigital transducers T2 and T4 (T2 group of IDTs). If an rf pulse is applied to each of the T1 group of IDTs, the rf pulse with a frequency approximately corresponding to the interdigital periodicity of the T1 group of IDTs is converted to the acoustic wave which is transmitted to the respective piezoelectric thin plate 7 in the input devices DTX and DTY and then transmitted to the substrate 5. The acoustic wave having a wavelength approximately corresponding to each interdigital periodicity of the interdigital transducers, R11, R12, R13, R14, R31, R32, R33 and R34 (R1 group of IDTs), is converted to a delay electric signal, which is detected at the R1 group of IDTs. If an rf pulse is applied to each of the T2 group of IDTs, the rf pulse with a frequency approximately corresponding to the interdigital periodicity of the T2 group of IDTs is converted to the acoustic wave which is transmitted to the respective piezoelectric thin plate 7 in the input devices DTX and DTY and then transmitted to the substrate 5. The acoustic wave having a wavelength approximately corresponding to each interdigital periodicity of the interdigital transducers, R21, R22, R23, R24, R41, R42, R43 and R44 (R2 group of IDTs), is converted to a delayed electric signal, which is detected at the R2 group of IDTs. If an rf pulse is applied to the T1 and T2 groups of IDTs alternately, a delayed electric signal is detected at the R1 and R2 groups of IDTs alternately. The connections between the interdigital transducers R11 and R21, R12 and R22, R13 and R23, R14 and R24, R31 and R41, R32 and R42, R33 and R43, and R34 and R44, make the circuit construction simple. In addition, the delayed electric signal ④ detected at each pair of the interdigital transducers, for example the pair of the interdigital transducers R11 and R21, is received so that they overlap each other. Therefore, when touching with a material, softer than the substrate 5 and easy to absorb the acoustic wave, on the propagation path between the T1 and R1 groups of IDTs, of the acoustic wave on the substrate 5, the acoustic wave on the touched position is decreased ⑤ only in case that an electric signal is applied to each of the T1 group of IDTs. In the same way, touching with the material on the propagation path between the T2 and R2 groups of IDTs, of the acoustic wave on the substrate 5, the acoustic wave on the touched position is decreased ⑥ only in case that an electric signal is applied to each of the T2 group of IDTs. Such the delayed electric signals ④, ⑤ and ⑥ are amplified via an amplifier and rectified via a voltage doubling rectifier, and then become a direct current signals ⑦, ⑧ and ⑨, respectively. By means of setting the threshold voltage at the proper value between the direct current signals ⑦ ⑧, and ⑨, the digital signals corresponding to the direct current signals ⑦, ⑧ and ⑨, respectively, are obtained in a comparator. The digital signals are taken in the computer as the parallel signals with a proper timing by the computer. Thus, the ultrasonic touch system shown in FIG. 16 has a short response time, and therefore has a high sensitivity. Accordingly, the touched position on the substrate 5 can be appointed clearly and quickly. If there are more ultrasonic transducing systems consisting of an input interdigital transducer and an output interdigital transducer, respectively, the touched position on the substrate 5 can be more strictly appointed.

Figure 21:
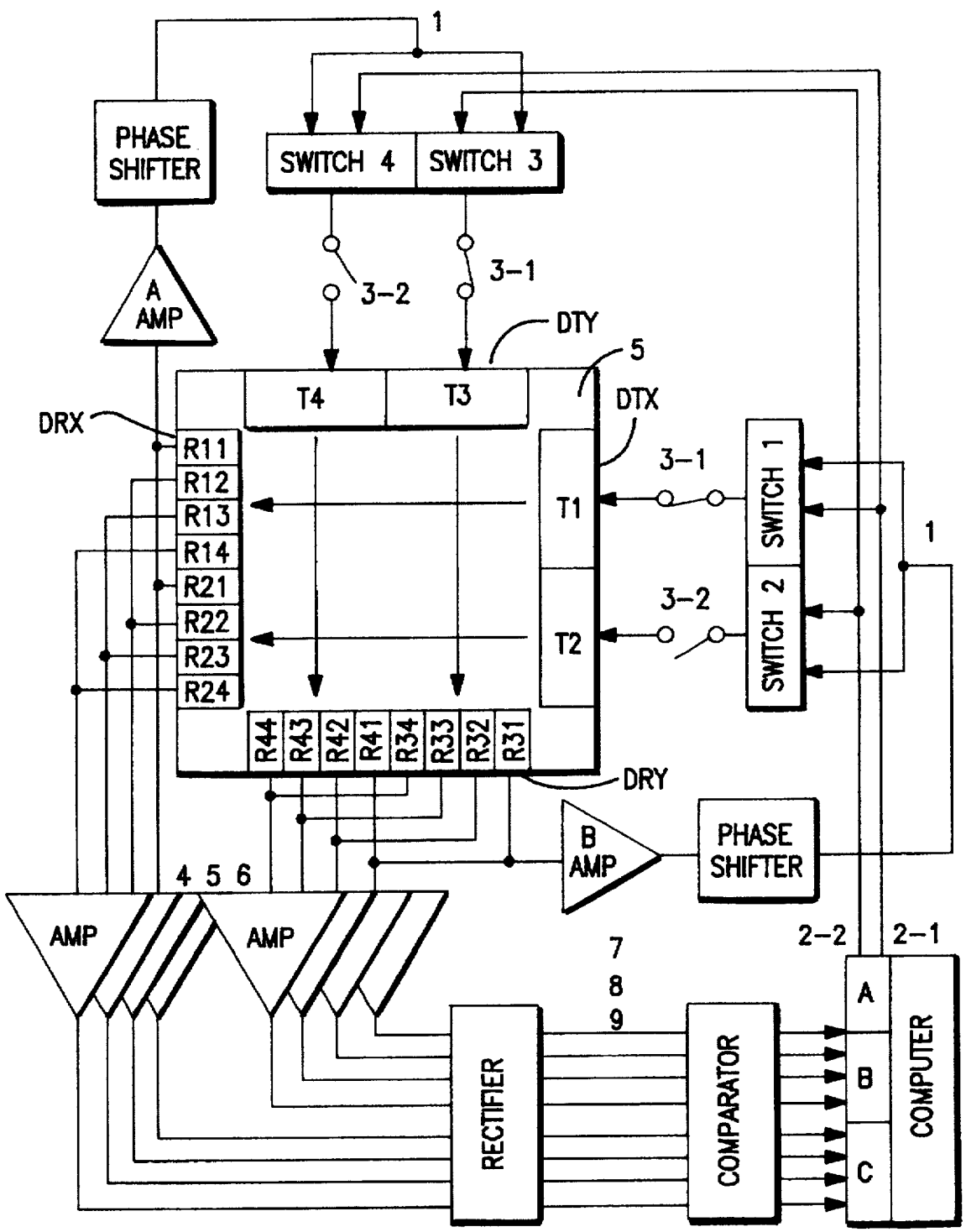
FIG. 21 shows a schematic illustration of the ultrasonic touch system, shown in FIG. 16, with a delay line oscillator.

FIG. 21 shows a schematic illustration of the ultrasonic touch system, shown in FIG. 16, under an operation with a delay line oscillator. The waveforms corresponding to the respective parts, ① ~⑨, seen in FIG. 21 are the same as the FIG. 20. The delay line oscillator has an 8-shaped signal loop which makes the area between the interdigital transducers T1 and R11, or T2 and R21 on the substrate 5 a first delay element, and the area between the interdigital transducers T3 and R31, or T4 and R41 thereon a second delay element. When operating the ultrasonic touch system shown in FIG. 21, switches, S1, S2, S3 and S4, are opened and closed by order of a computer. While the switches S1 and S3 (S1 group of switches) are closed, the switches S2 and S4 (S2 group of switches) are opened. Thus, an electric signal is applied to the T1 and T2 groups of IDTs, alternately, by opening and closing of the S1 and S2 groups of switches alternately. An electric signal ① applied to the T1 or T2 groups of IDTs is modulated to rf pulses ③-1 or ③-2, respectively, by the corresponding clock pulses ②-1 or ②-2 from a computer. If the rf pulse ③-1 is applied to the T1 group of IDTs, then when the S1 group of switches are closed, the rf pulse ③-1 with a frequency approximately corresponding to the interdigital periodicity of the T1 group of IDTs is converted to the acoustic wave which is transmitted to the respective piezoelectric thin plate 7 in the input devices DTX and DTY and then transmitted to the substrate 5. The acoustic wave having a wavelength approximately corresponding to each interdigital periodicity of the interdigital transducers, R11, R12, R13, R14, R31, R32, R33 and R34 (R1 group of IDTs), is converted to a delayed electric signal, which is detected at the R1 group of IDTs. If the rf pulse ③-2 is applied to the T2 group of IDTs, then when the S2 group of switches are closed, the rf pulse ③-2 with a frequency approximately corresponding to the interdigital periodicity of the T2 group of IDTs is converted to the acoustic wave which is transmitted to the respective piezoelectric thin plate 7 in the input devices DTX and DTY and then transmitted to the substrate 5. The acoustic wave having a wavelength approximately corresponding to each interdigital periodicity of the interdigital transducers, R21, R22, R23, R24, R41, R42, R43 and R44 (R2 group of IDTs), is converted to a delayed electric signal, which is detected at the R2 group of IDTs. Thus, if an electric signal is applied to the T1 and T2 groups of IDTs alternately, a delayed electric signal is detected at the R1 and R2 groups of IDTs alternately. The connections between the interdigital transducers R11 and R21, R12 and R22, R13 and R23, R14 and R24, R31 and R41, R32 and R42, R33 and R43, and R34 and R44, make the circuit construction simple. In addition, the delayed electric signal ④ detected at each pair of the interdigital transducers, for example the pair of the interdigital transducers R11 and R21, is received so that they overlap each other. A part of the delayed electric signal ④ detected at the pair of the interdigital transducers R11 and R21 and a part of the delayed electric signal ④ detected at the pair of the interdigital transducers R31 and R41 are amplified via the amplifiers A and B, respectively, and each phase thereof is shifted to the fixed value via each phase shifter, the two electric signals with each shifted phase are applied to the T1 and T2 groups of IDTs again, respectively, through the S1 and S2 groups of switches. In short, the electric signals applied to the interdigital transducers T1 and T2 through the switches S1 and S2 are applied to the interdigital transducers T3 and T4 through the switches S3 and S4, and the electric signals applied to the interdigital transducers T3 and T4 through the switches S3 and S4 are applied to the interdigital transducers T1 and T2 through the switches S1 and S2. Thus, the delay line oscillator having the 8-shaped signal loop is constructed. The delayed electric signal ④ detected at each pair of the interdigital transducers is decreased ⑤ or ⑥ in response to a touch on the substrate 5. When touching with a material, softer than the substrate 5 and easy to absorb the acoustic wave, on the propagation way, made from the T1 and R1 groups of IDTs, of the acoustic wave on the substrate 5, the acoustic wave on the touched position is decreased ⑤ only in case that an electric signal is applied to each of the T1 group of IDTs. In the same way, touching with the material on the propagation way, made from the T2 and R2 groups of IDTs, of the acoustic wave on the substrate 5, the acoustic wave on the touched position is decreased ⑥ only in case that an electric signal is applied to each of the T2 group of IDTs. Such the delayed electric signals ④, ⑤ and ⑥ are amplified via an amplifier and rectified via a voltage doubling rectifier, and then become a direct current signals ⑦, ⑧ and ⑨, respectively. By means of setting the threshold voltage at the proper value between the direct current signals ⑦ and ⑧, or ⑦ and ⑨, the digital signals corresponding to the direct current signals ⑦, ⑧ and ⑨, respectively, are obtained via a comparator. The digital signals are taken into the computer in the form of the parallel signals with a proper timing by the computer. The operation with the delay line oscillator has no need for a function generator. Therefore, it is possible to provide the ultrasonic touch system, with a smaller size which is very light in weight and has a simple structure, capable of an operation under low power consumption with low voltage as compared with the case of the rf pulse operation shown in FIG. 19.

When operating the ultrasonic touch system shown in FIG. 16, an information given in a color is appeared on the display face 6 in response to the touched position by order of the computer. At this time, the frequency of the electric signal applied to the T1 or T2 group of IDTs is corresponding to the color. It is possible to look at the information on the display face 6 through the substrate 5. When touching on the propagation medium of the acoustic wave on the substrate 5, the acoustic wave decreases and the information given in the color corresponding to the touched position is appeared on the display face 6. It is possible by means of changing the frequency of the input electric signal to indicate each information given in the color corresponding to the frequency of the input electric signal on the identical position of the display face 6. Therefore, when using two kinds of frequencies of the input electric signals, two kinds of the information given in each color on the identical position of the display face 6 are obtained. In addition, the information can be indicated for a fixed period. Thus, when writing, for example, a character with a material, softer than the substrate 5 and easy to absorb the acoustic wave, on the substrate 5, the character is appeared on the display face 6. If the ultrasonic touch system shown in FIG. 16 has the interdigital transducers as shown in FIG. 18(a), two kinds of input electric signals having the respective frequencies, which are corresponding to the respective interdigital periodicities and different from each other, can be applied to the interdigital transducer. Moreover, it is possible to more increase the number of the input electric signal, because there are many kinds of the frequencies approximately corresponding to each interdigital periodicity. As a result, many kinds of information given in each color can be appeared on the display face 6 by changing the frequency of the input electric signal.

Figure 23:
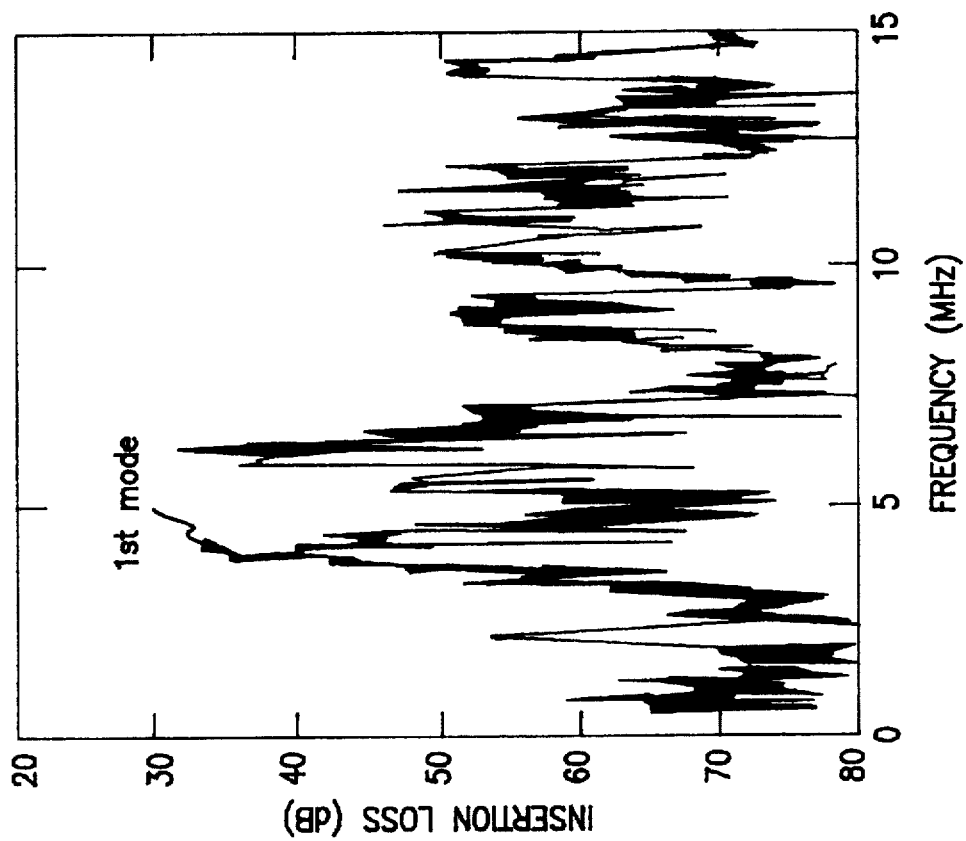
FIG. 23 shows the frequency dependence of the insertion loss between the interdigital transducers T1 and R11 when the substrate 5 is being touched.
Figure 22:
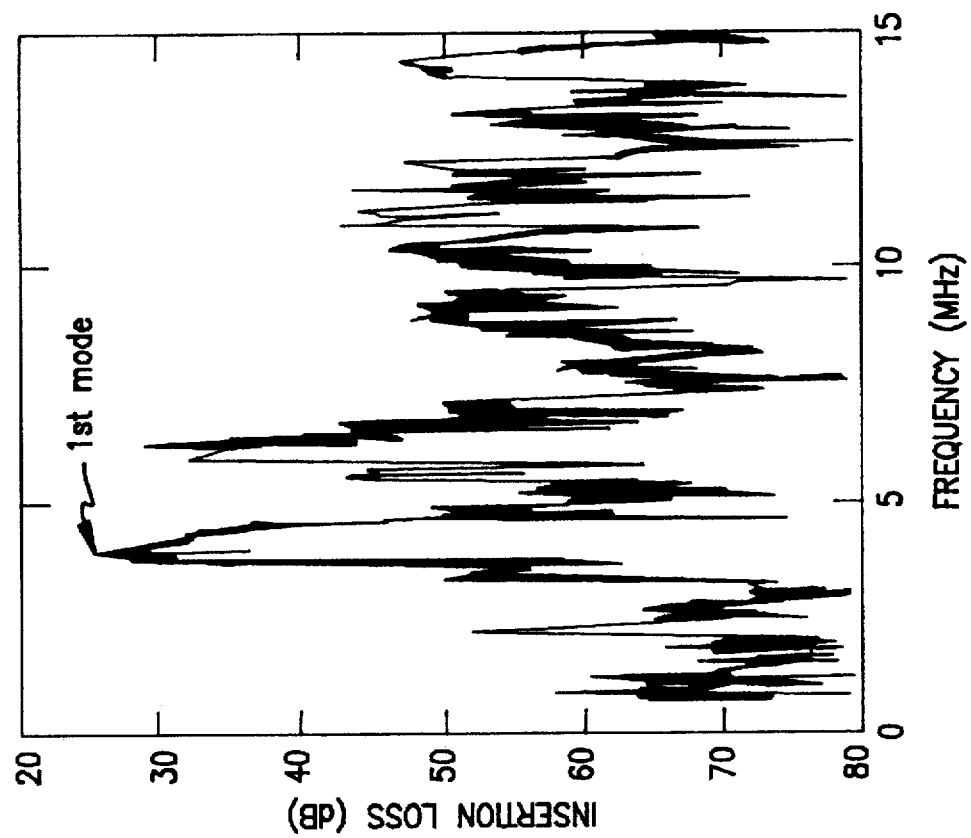
FIG. 22 shows the frequency dependence of the insertion loss between the interdigital transducers T1 and R11 when the substrate 5 is not being touched.

FIG. 22 shows the frequency dependence of the insertion loss between the interdigital transducers T1 and R11 in case of untouching on the substrate 5. FIG. 23 shows the frequency dependence of the insertion loss between the interdigital transducers T1 and R11 in case of touching on the substrate 5. The peak around 3.96 MHz corresponds to the first mode acoustic wave. The difference between the insertion loss in case of untouching on the substrate 5 and that in case of touching on the substrate 5 is about 10 dB with regard to the first mode acoustic wave. The difference on the insertion loss is enough to treat the electric signals in the ultrasonic touch system shown in FIG. 16.

Figure 24:
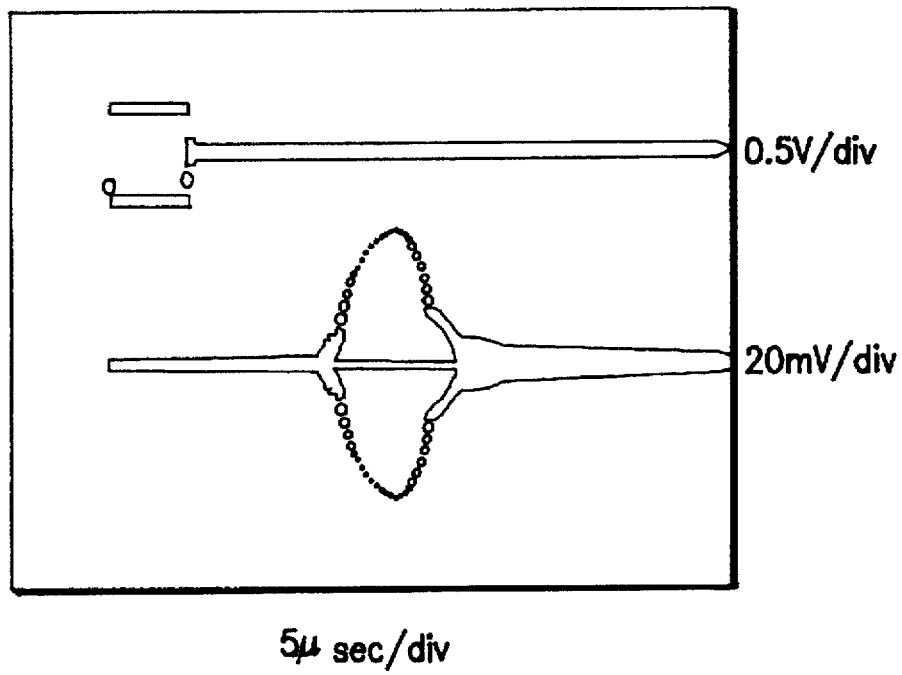
FIG. 24 shows the response between the interdigital transducers T1 and R11 under operation with 3.96 MHz rf pulse when the substrate 5 is not being touched.
Figure 25:
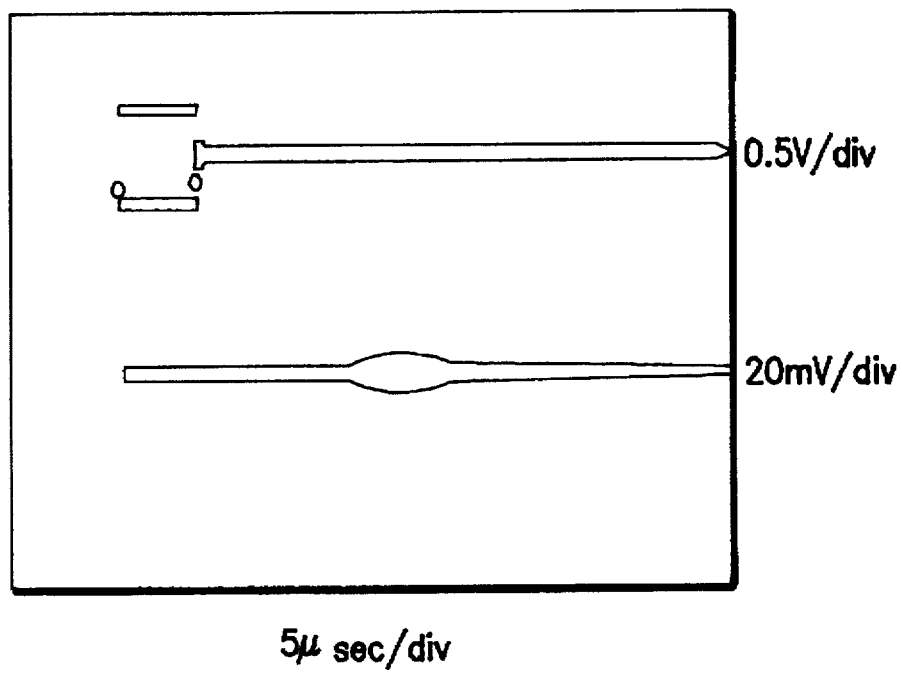
FIG. 25 shows the response between the interdigital transducers T1 and R11 under operation with 3.96 MHz rf pulse when the substrate 5 is being touched.

FIG. 24 shows the response between the interdigital transducers T1 and R11 under operation with 3.96 MHz rf pulse in case of untouching on the substrate 5. FIG. 25 shows the response between the interdigital transducers T1 and R11 under operation with 3.96 MHz rf pulse in case of touching on the substrate 5. Since there is the substrate 5 between the interdigital transducers T1 and R11, the waveforms without spurious signals are observed with a good response to touch on the substrate 5. Therefore, it is easy to treat the electric signals in the ultrasonic touch system shown in FIG. 16.

Figure 26:
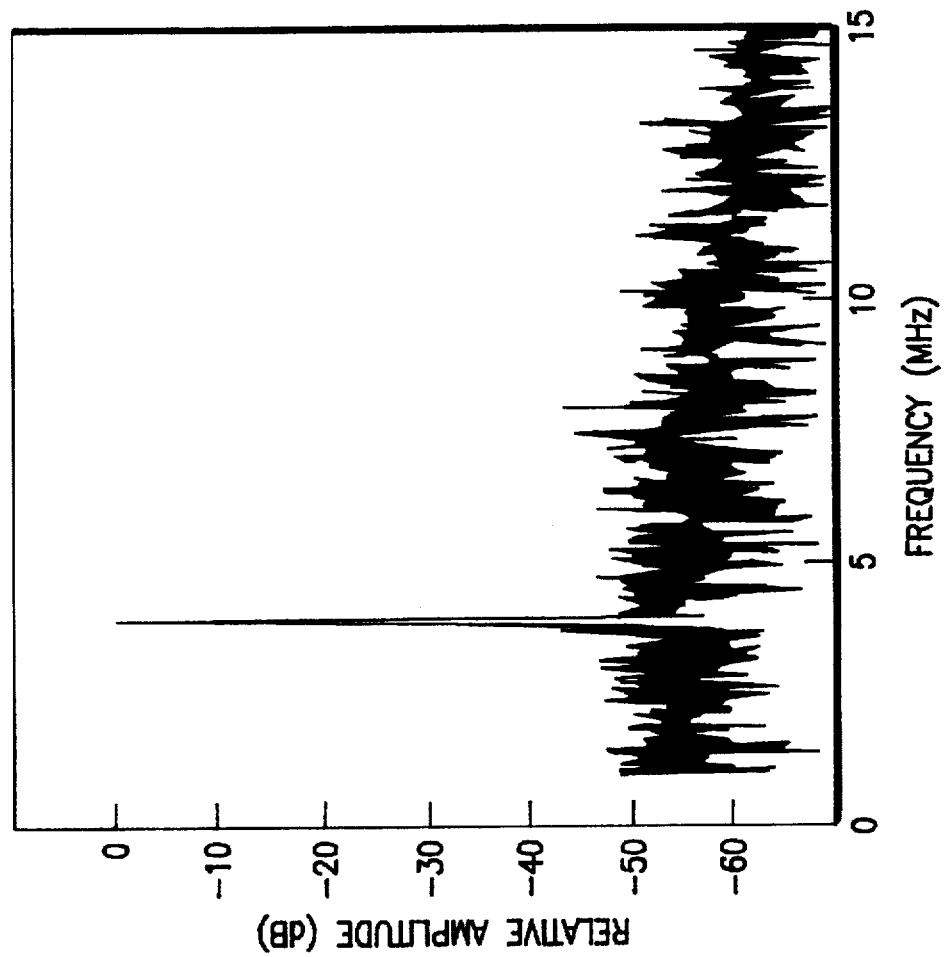
FIG. 26 shows the relationship between the relative amplitude and the frequency in the delay line oscillator shown in FIG. 21.

FIG. 26 shows the relationship between the relative amplitude and the frequency in the delay line oscillator shown in FIG. 21. In FIG. 26 $f_o$ corresponds to the fundamental mode wave with the frequency of 3.951 MHz. Because the ultrasonic touch system shown in FIG. 16 is designed with the first mode, the stable oscillation without the influence of other modes is obtained. In addition, the acoustic wave is transmitted on the substrate 5 almost without extension of the acoustic wave, causing easy oscillation without the influence of other modes.

Figure 27:
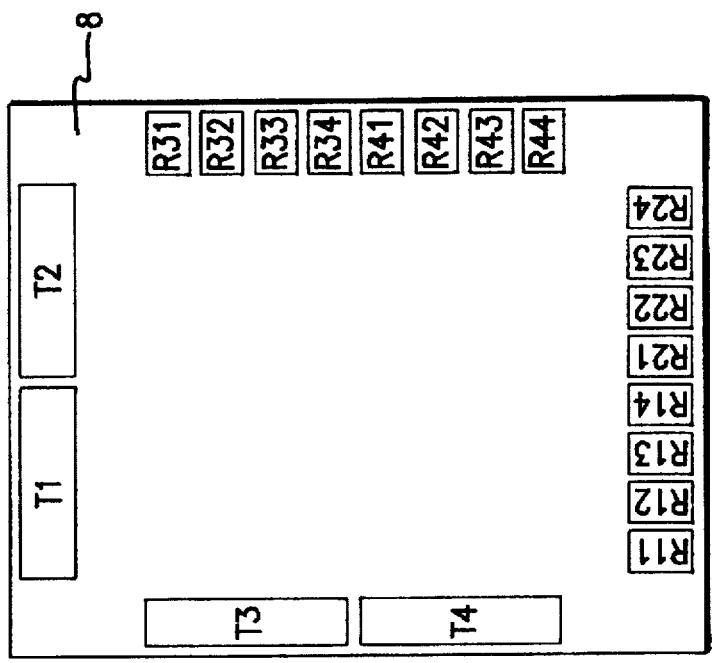
FIG. 27 shows a plan view of the ultrasonic touch system according to a fourth embodiment of the present invention.

FIG. 27 shows a plan view of an ultrasonic touch system according to a fourth embodiment of the present invention. The ultrasonic touch system comprises 14 interdigital transducers, having each overlap length of 5 mm, 56 interdigital transducers, made from aluminium thin film, having each overlap length of 0.8 mm, a piezoelectric substrate 8 being 128 rotated Y cut X propagation LiNbO3 with dimensions of 50 mm in length, 40 mm in width and 0.5 mm in thickness, and a display face 9 being not drawn in FIG. 27. Only the interdigital transducers, T1, T2, T3 and T4, having each overlap length of 5 mm and the interdigital transducers, R11, R12, R13, R14, R21, R22, R23, R24, R31, R32, R33, R34, R41, R42, R43 and R44, having each overlap length of 0.8 mm are drawn in FIG. 27. The display face 9 included in a display device is mounted on the other surface, without the input and output devices, of the piezoelectric substrate 8.

Each interdigital transducer, whose type is normal, consisting of 7.5 finger pairs, has an interdigital periodicity of 640 μcm.

FIG. 28 shows a plan view of the interdigital transducers, T1, T2, R11, R12, R13, R14, R21, R22, R23 and R24, in the ultrasonic touch system shown in FIG. 27. The interdigital transducers T1 and T2 are placed opposite to the interdigital transducers, R11, R12, R13, R14, R21, R22, R23 and R24. In the same way, the interdigital transducers T3 and T4 are placed opposite to the interdigital transducers, R31, R32, R33, R34, R41, R42, R43 and R44. The interdigital transducers, T1, T2, T3 and T4, are used for input. The interdigital transducers, R11, R12, R13, R14, R21, R22, R23, R24, R31, R32, R33, R34, R41, R42, R43 and R44, are used for output. The interdigital transducers, R11, R12, R13 and R14, correspond to the interdigital transducer T1. The interdigital transducers, R21, R22, R23 and R24, correspond to the interdigital transducer T2. The interdigital transducers, R31, R32, R33 and R34, correspond to the interdigital transducer T3. The interdigital transducers, R41, R42, R43 and R44, correspond to the interdigital transducer T4.

If an electric signal is applied to the input interdigital transducer in the ultrasonic touch system shown in FIG. 27, respectively, the acoustic wave is generated on the piezoelectric substrate 8. The acoustic wave is converted to each electric signal which is detected at the output interdigital transducer. Thus, the 14 input interdigital transducers and the 56 output interdigital transducers make 56 ultrasonic transducing systems classified into two groups, the propagation direction of the acoustic wave on the piezoelectric substrate 8 in the one group being perpendicular to that in the other group. Accordingly, the ultrasonic touch system shown in FIG. 27 has a simple structure with a small size which is very light in weight, and is operated under a low power consumption with a low voltage.

It is possible to employ interdigital transducers, having at least two kinds of interdigital periodicities as show in FIG. 18, in the ultrasonic touch system shown in FIG. 27. For example, the interdigital transducers composed of two parts, respectively, are used, one consisting of five finger pairs with an interdigital periodicity of 178 μm, the other consisting of five finger pairs with an interdigital periodicity of 160 μm. When the interdigital transducers are employed, they are placed such that each part consisting of five finger pairs with an interdigital periodicity of 160 μm are closest each other, because the acoustic wave with a higher frequency is attenuated more in the piezoelectric substrate 8. Thus, the interdigital transducers are placed such that the part with a smaller interdigital periodicity has a smaller propagation distance of the acoustic wave. The arrangement such that the finger pairs with a smaller interdigital periodicity are closest to each other reduces the attenuation of the acoustic wave on the piezoelectric substrate 8.

In the ultrasonic touch system shown in FIG. 27 an rf pulse operation seen in FIG. 19 can be employed. In this case, the respective parts, ①–⑨, corresponds to the waveforms shown in FIG. 20. When operating the ultrasonic touch system shown in FIG. 27, a continuous wave ① generated by a function generator is modulated to rf pulses ③-1 and ③-2 in the corresponding double balanced mixers (DBMs) 1 and 2 by the corresponding clock pulses ②-1 and ②-2 from a computer. The DBM 1 and the DBM 2 play a role of switching to apply with an rf pulse to the interdigital transducers T1 and T3 (T1 group of IDTs) or the interdigital transducers T2 and T4 (T2 group of IDTs). If an rf pulse is applied to each of the T1 group of IDTs, the rf pulse with a frequency approximately corresponding to the interdigital periodicity of the T1 group of IDTs is converted to the acoustic wave which is transmitted to the piezoelectric substrate 8. The acoustic wave having a wavelength approximately corresponding to each interdigital periodicity of the interdigital transducers, R11, R12, R13, R14, R31, R32, R33 and R34 (R1 group of IDTs), is converted to a delayed electric signal, which is detected at the R1 group of IDTs. If an rf pulse is applied to each of the T2 group of IDTs, the rf pulse with a frequency approximately corresponding to the interdigital periodicity of the T2 group of IDTs is converted to the acoustic wave which is transmitted to the piezoelectric substrate 8. The acoustic wave having a wavelength approximately corresponding to each interdigital periodicity of the interdigital transducers, R21, R22, R23, R24, R41, R42, R43 and R44 (R2 group of IDTs), is converted to a delayed electric signal, which is detected at the R2 group of IDTs. If an rf pulse is applied to the T1 and T2 groups of IDTs alternately, a delayed electric signal is detected at the R1 and R2 groups of IDTs alternately. The connections between the interdigital transducers R11 and R21, R12 and R22, R13 and R23, R14 and R24, R31 and R41, R32 and R42, R33 and R43, and R34 and R44, make a circuit construction simple. In addition, the delayed electric signal ④ detected at each pair of the interdigital transducers, for example the pair of the interdigital transducers R11 and R21, is received so that they overlap each other. Therefore, when touching with a material, softer than the piezoelectric substrate 8 and easy to absorb the acoustic wave, on the propagation path between the T1 and R1 groups of IDTs, of the acoustic wave on the piezoelectric substrate 8, the acoustic wave on the touched position is decreased ⑤ only in case that an electric signal is applied to each of the T1 group of IDTs. In the same way, touching with the material on the propagation way, made from the T2 and R2 groups of IDTs, of the acoustic wave on the piezoelectric substrate 8, the acoustic wave on the touched position is decreased ⑥ only in case that an electric signal is applied to each of the T2 group of IDTs. Such the delayed electric signals ④, ⑤ and ⑥ are amplified via an amplifier and rectified via a voltage doubling rectifier, and then become a direct current signals ⑦, ⑧ and ⑨, respectively. By means of setting the threshold voltage at the proper value between the direct current signals ⑦ and ⑧, or ⑦ and ⑨, the digital signals corresponding to the direct current signals ⑦, ⑧ and ⑨, respectively, are obtained via a comparator. The digital signals are taken into the computer in the form of the parallel signals with a proper timing by the computer. Thus, the ultrasonic touch system shown in FIG. 27 has a short response time, and therefore has a high sensitivity. Accordingly, the touched position on the piezoelectric substrate 8 can be appointed clearly and quickly. If there are more ultrasonic transducing systems consisting of an input interdigital transducer and an output interdigital transducer, respectively, the touched position on the piezoelectric substrate 8 can be more strictly appointed.

Figure 29:
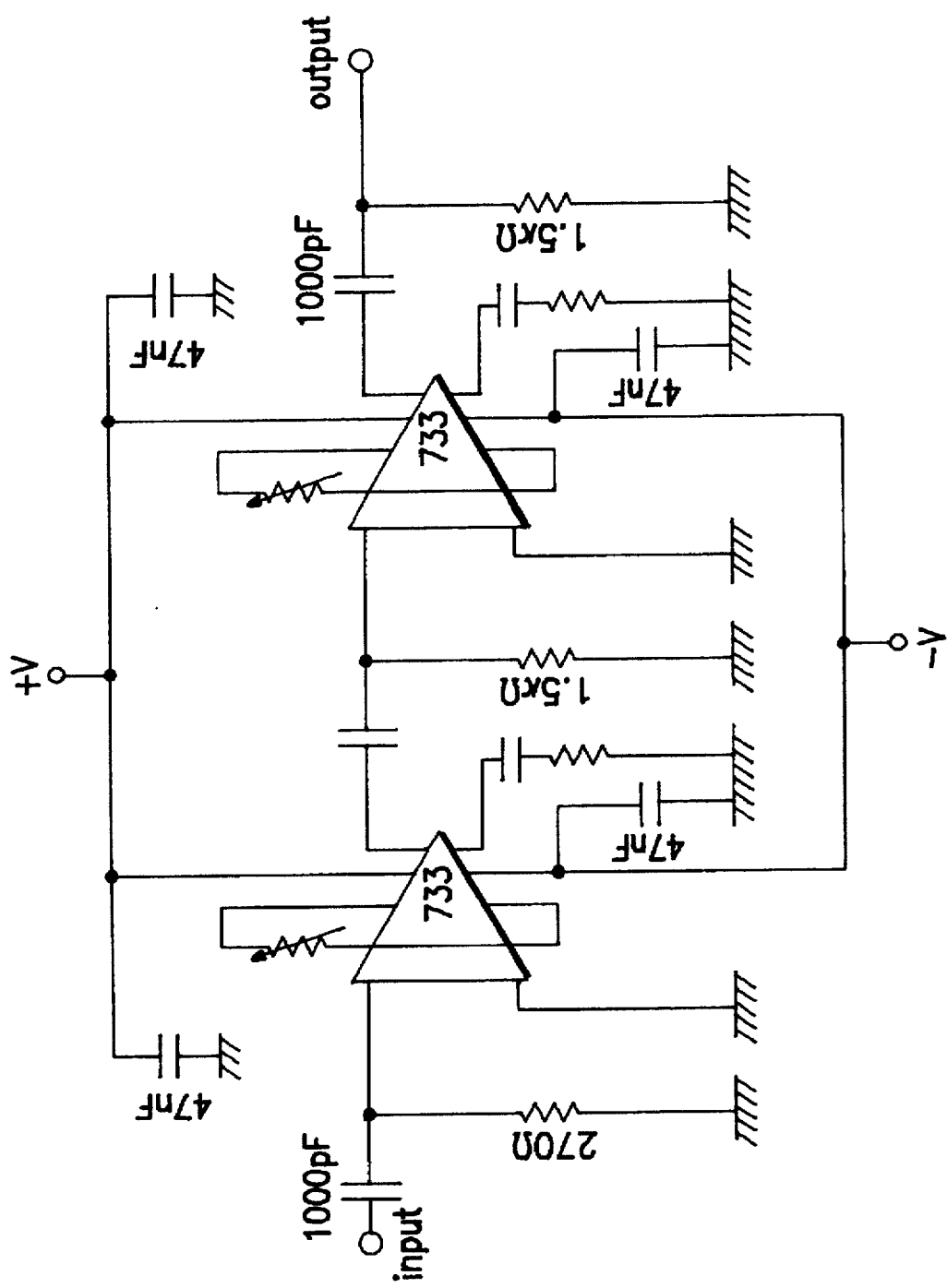
FIG. 29 shows a circuit diagram of the amplifier A or B with the delay line oscillator in FIG. 27.

In the ultrasonic touch system shown in FIG. 27 an operation as a delay line oscillator seen in FIG. 21 can be employed. In this case, the respective parts, ①–⑨, corresponds to the waveforms shown in FIG. 20. FIG. 29 shows a circuit diagram of the amplifier A or B under operation with the delay line oscillator in FIG. 27. When operating the ultrasonic touch system shown in FIG. 27, switches, S1, S2, S3 and S4, are opened and closed by order of a computer. While the switches S1 and S3 (S1 group of switches) are closed, the switches S2 and S4 (S2 group of switches) are opened. Thus, an electric signal is applied to the T1 and T2 groups of IDTs, alternately, by opening and closing of the S1 and S2 groups of switches alternately. An electric signal ① applied to the T1 or T2 group of IDTs is modulated to rf pulses ③-1 or ③-2, respectively, by the corresponding clock pulses ②-1 or ②-2 from a computer. If the rf pulse ③-1 is applied to the T1 group of IDTs, then when the S1 group of switches are closed, the rf pulse ③-1 with a frequency approximately corresponding to the interdigital periodicity of the T1 group of IDTs is converted to the acoustic wave which is transmitted to the piezoelectric substrate 8. The acoustic wave having a wavelength approximately corresponding to each interdigital periodicity of the interdigital transducers, R11, R12, R13, R14, R31, R32, R33 and R34 (R1 group of IDTs), is converted to a delayed electric signal, which is detected at the R1 group of IDTs. If the rf pulse ③-2 is applied to the T2 group of IDTs, then when the S2 group of switches are closed, the rf pulse ③-2 with a frequency approximately corresponding to the interdigital periodicity of the T2 group of IDTs is converted to the acoustic wave which is transmitted to the piezoelectric substrate 8. The acoustic wave having a wavelength approximately corresponding to each interdigital periodicity of the interdigital transducers, R21, R22, R23, R24, R41, R42, R43 and R44 (R2 group of IDTs), is converted to a delayed electric signal, which is detected at the R2 group of IDTs. Thus, if an electric signal is applied to the T1 and T2 groups of IDTs alternately, a delayed electric signal is detected at the R1 and R2 groups of IDTs alternately. The connections between the interdigital transducers R11 and R21, R12 and R22, R13 and R23, R14 and R24, R31 and R41, R32 and R42, R33 and R43, and R34 and R44, make a circuit construction simple. In addition, the delayed electric signal ④ detected at each pair of the interdigital transducers, for example the pair of the interdigital transducers R11 and R21, is received so that they overlap each other. A part of the delayed electric signal ④ detected at the pair of the interdigital transducers R11 and R21 and a part of the delayed electric signal ④ detected at the pair of the interdigital transducers R31 and R41 are amplified via the amplifiers A and B, respectively, and each phase thereof is shifted to the fixed value via each phase shifter, the two electric signals with each shifted phase are applied to the T1 and T2 groups of IDTs again, respectively, through the S1 and S2 groups of switches. In short, the electric signals applied to the interdigital transducers T1 and T2 through the switches S1 and S2 are applied to the interdigital transducers T3 and T4 through the switches S3 and S4, and the electric signals applied to the interdigital transducers T3 and T4 through the switches S3 and S4 are applied to the interdigital transducers T1 and T2 through the switches S1 and S2. Thus, the delay line oscillator having the 8-shaped signal loop is constructed. The delayed electric signal ④ detected at each pair of the interdigital transducers is decreased ⑤ or ⑥ in response to a touch on the piezoelectric substrate 8. When touching with a material, softer than the piezoelectric substrate 8 and easy to absorb the acoustic wave, on the propagation path between the T1 and R1 groups of IDTs, of the acoustic wave on the piezoelectric substrate 8, the acoustic wave on the touched position is decreased ⑤ only in case that an electric signal is applied to each of the T1 group of IDTs. In the same way, touching with the material on the propagation way, made from the T2 and R2 groups of IDTs, of the acoustic wave on the piezoelectric substrate 8, the acoustic wave on the touched position is decreased ⑥ only in case that an electric signal is applied to each of the T2 group of IDTs. Such the delayed electric signals ④, ⑤ and ⑥ are amplified via an amplifier and rectified via a voltage doubling rectifier, and then become a direct current signals ⑦, ⑧ and ⑨, respectively. By means of setting the threshold voltage at the proper value between the direct current signals ⑦ and ⑧, or ⑦ and ⑨, the digital signals corresponding to the direct current signals ⑦, ⑧ and ⑨, respectively, are obtained via a comparator. The digital signals are taken into the computer in the form of the parallel signals with a proper timing by the computer. The operation with the delay line oscillator has no need for a function generator. Therefore, it is possible to provide the ultrasonic touch system, with a smaller size which is very light in weight and has a simple structure, capable of an operation under low power consumption with low voltage as compared with the case of the rf pulse operation.

When operating the ultrasonic touch system shown in FIG. 27, an information given in a color is appeared on the display face 9 in response to the touched position. At this time, the frequency of the electric signal applied to the T1 or T2 group of IDTs corresponds to the color. It is possible to look the information on the display face 9 through the piezoelectric substrate 8. When touching on the propagation medium of the acoustic wave on the piezoelectric substrate 8, the acoustic wave decreases and the information given in the color corresponding to the touched position appears on the display face 9. It is possible by means of changing the frequency of the input electric signal to indicate each information given in the color corresponding to the frequency of the input electric signal on the identical position of the display face 9. Therefore, when using two kinds of frequencies of the input electric signals, two kinds of the information given in each color on the identical position of the display face 9 are superposed. In addition, the information can be indicated for a fixed period. Thus, when writing, for example, a character with a material, softer than the piezoelectric substrate 8 and easy to absorb the acoustic wave, on the piezoelectric substrate 8, the character appears on the display face 9. If the ultrasonic touch system shown in FIG. 27 has the interdigital transducers as shown in FIG. 18(a), two kinds of input electric signals having different frequencies, which correspond to the respective interdigital periodicities, can be applied to the interdigital transducers. Moreover, it is possible to more increase the number of the input electric signal, because there are many kinds of frequencies approximately corresponding to each interdigital periodicity. As a result, many kinds of information given in each color can be appeared on the display face 9 by changing the frequency of the input electric signal.

Figure 30:
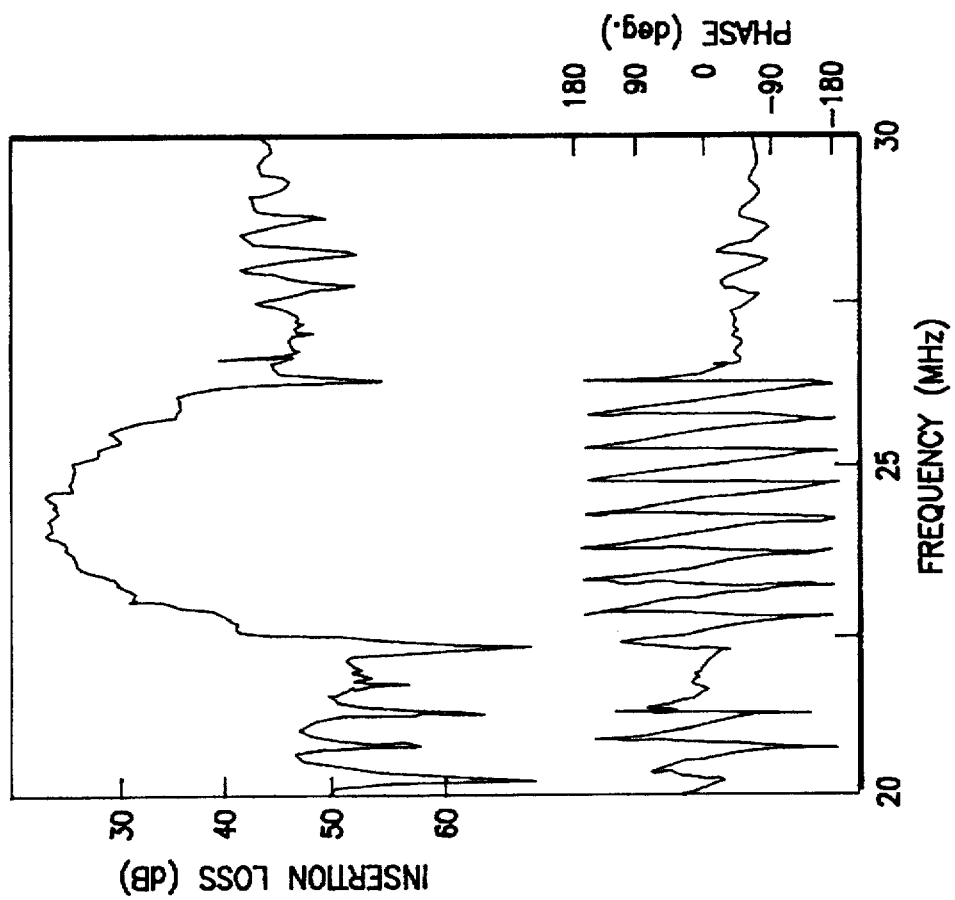
FIG. 30 shows the frequency dependencies of the insertion loss and the phase of the delay line oscillator employed in the ultrasonic touch system shown in FIG. 27.

FIG. 30 shows the frequency dependencies of the insertion loss and the phase of the delay line oscillator employed in the ultrasonic touch system shown in FIG. 27.

Figure 31:
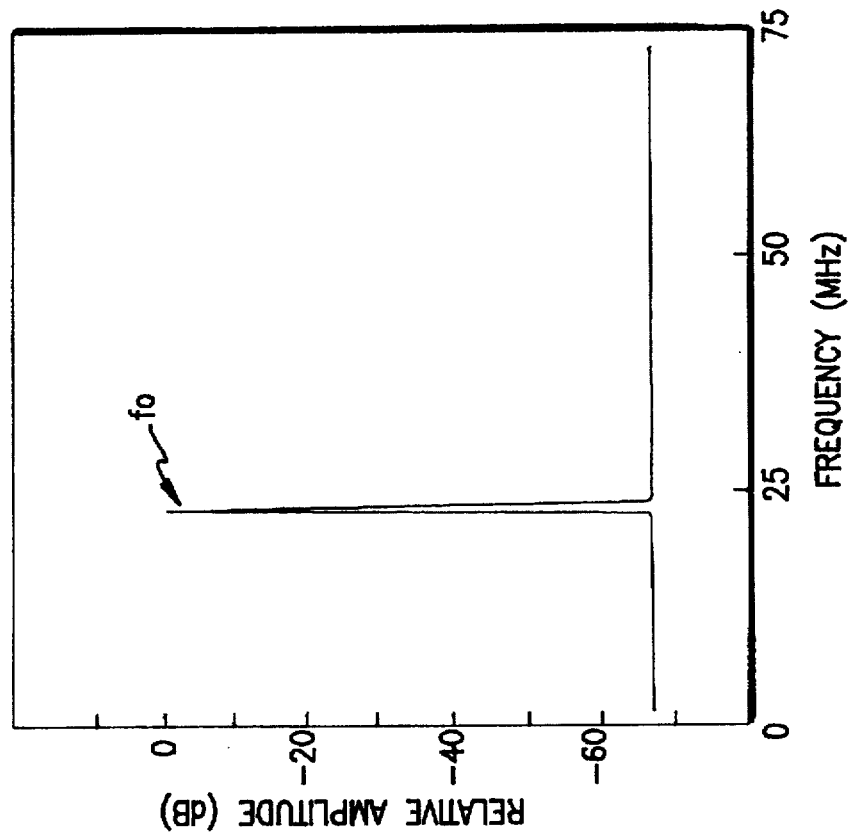
FIG. 31 shows the relationship between the relative amplitude and the frequency in the delay line oscillator employed in the ultrasonic touch system shown in FIG. 27.

FIG. 31 shows the relationship between the relative amplitude and the frequency in the delay line oscillator employed in the ultrasonic touch system shown in FIG. 27, where fo corresponds to the fundamental mode wave with the frequency of 24.3 MHz. The stable oscillation is obtained.

When the piezoelectric substrate 8 comprises a transparent piezoelectric ceramic such as $(Pb.La)(Zr.Ti)O_3$, what is called the PLZT, the directions of the polarization axis and the thickness of the transparent piezoelectric ceramic running parallel with each other, the acoustic wave can be generated on the piezoelectric substrate 8 effectively. Moreover, it is possible to look many kinds of information on the display face 9 through the piezoelectric substrate 8 by using the transparent piezoelectric ceramic as the piezoelectric substrate 8. In order to transmit the acoustic wave to the piezoelectric substrate 8, the thickness of the piezoelectric substrate 8 is requested to be over three times as much as the interdigital periodicity of the input interdigital transducer. In case that the thickness of the piezoelectric substrate 8 is smaller than the interdigital periodicity, the Lamb wave is transmitted to the piezoelectric substrate 8. However, it is possible to use the Lamb wave mode, if it has the modes capable of fulfilling the sensing function in the ultrasonic touch system shown in FIG. 27. In place of the transparent piezoelectric ceramic, the single crystal, having transparency and piezoelectricity, such as $LiNbO_3$, $LiTaO_3$ and so on, can be used as the piezoelectric substrate 8. When using the single crystal as the piezoelectric substrate 8, it is necessary to design the ultrasonic touch system in consideration of the electromechanical coupling constant $k^2$ because of the anisotropy of the single crystal. Furthermore, there is the possibility to be in need of an extra complicated circuit. However, the single crystal is promising as the piezoelectric substrate. The PLZT is promising as the piezoelectric ceramic substrate among other things, because of the transparency, manufacturing and durability thereof being excellent. By making use of the transverse isotropy of the piezoelectric substrate 8 made from the PLZT, the electric signal levels of the two groups of the output interdigital transducers become equal, the propagation directions of the acoustic wave on the piezoelectric substrate 8 in the two groups of the output interdigital transducers being perpendicular to each other. Accordingly, the circuit construction becomes so simple that it is possible to provide the ultrasonic touch system not only with a smaller size which is very light in weight and has a simple structure. In addition, because of the output signals being always unified, the signal treatment becomes accuracy and the sensitivity becomes high. Furthermore, since the resolution of the electric signal is increased, the quantity of the information can be increased.

I claim:

1. An ultrasonic touch system comprising:

a substrate;

at least one ultrasonic transducing system on one surface of said substrate, said ultrasonic transducing system comprising emitting transducers (T) and receiving transducers (R) corresponding to said emitting transducers, said emitting and receiving transducers being arranged to face each other on said surface of said substrate making a pair so that a transmitting direction of an acoustic wave generated by one of said emitting transducers is the same as the receiving direction of said acoustic wave by a corresponding one of said receiving transducers;

means for applying an electric signal to said emitting transducers for exciting said acoustic wave;

means for delivering an electric signal, having a frequency approximately corresponding to the wavelength of said acoustic wave, generated from said receiving transducers;

means for determining a touch on a part of the substrate where the acoustic wave propagates in reliance on a magnitude of said electric signal delivered by said means for delivering;

said emitting and receiving transducers each comprising sets of interdigital transducers, wherein said means for applying an electric signal to said emitting transducers is for applying an electric signal having a frequency approximately corresponding to an interdigital periodicity of one of said sets of interdigital emitting transducers so that said acoustic wave is generated on said surface having a wavelength approximately equal to said interdigital periodicity; and wherein said sets of interdigital emitting and receiving transducers have at least two interdigital periodicities varying in a direction perpendicular to said interdigital transducers.

2. A system as defined in claim 1, wherein a one of said sets of emitting interdigital transducers having a smaller periodicity is closer to a one of said sets of receiving interdigital transducers having the smaller periodicity than a one of said sets of receiving interdigital transducers have a larger periodicity.

3. A system as defined in claim 1, wherein a display device is mounted on the opposite surface of said substrate, said display device being capable of indicating different colors.

4. A system according to claim 3, wherein said different colors correspond to different frequencies of said electric signal applied to said sets of interdigital emitting transducers.

5. A system as claimed in claim 1, wherein said substrate comprises an almost transparent piezoelectric ceramic, the direction of a polarization axis thereof being parallel to the thickness direction thereof, said interdigital transducers being mounted directly on said surface of said substrate.

6. A system as defined in claim 1, wherein said substrate comprises:

a nonpiezoelectric body, said ultrasonic transducing system comprising an input device having a first piezoelectric thin plate and said interdigital emitting transducer mounted thereon, and an output device having a second piezoelectric thin plate and said interdigital receiving transducer mounted thereon, said first and second piezoelectric thin plates being mounted on said surface.

7. A system as defined in claim 6, wherein a thickness of said first piezoelectric thin plate is less than the interdigital periodicity of said interdigital emitting transducer, and the thickness of said second piezoelectric thin plate is less than the interdigital periodicity of said interdigital receiving transducer, said interdigital periodicities of said interdigital emitting and receiving transducers being approximately equal to the wavelength of said acoustic wave of the first mode or higher modes, the phase velocity of said acoustic wave of said first mode or higher modes being approximately equal to the propagation velocity of the acoustic wave generated on said substrate as a mono-layer medium.

8. A system as defined in claim 6, wherein said piezoelectric first and second thin plates are cemented on said surface with said interdigital emitting transducer in said first piezoelectric thin plate and the surface with said interdigital receiving transducer in said second piezoelectric thin plate.

9. A system as defined in claim 6, wherein the other surface of said substrate opposite said interdigital emitting transducer and the other surface opposite said interdigital receiving transducer are covered with a metal thin layer.

10. A system as defined in claim 6, wherein said first and second piezoelectric thin plates comprise:

a piezoelectric ceramic, a direction of the polarization axis thereof being parallel to a thickness direction thereof.

11. A system as defined in claim 6, wherein said first and second piezoelectric thin plates comprise:

a piezoelectric thin film made from highly polymerized compound.

12. An ultrasonic touch system according to claim 1, wherein said ultrasonic transducing system comprises:

N interdigital groups of sets of emitting transducers ($T_i$; i=1, 2, - - - , N) and N groups of sets of interdigital receiving transducers ($Q_i$; i=1, 2, - - - , N) consisting of at least a first and a second set of interdigital receiving transducers ($R_{i,1}$ and $R_{i,2}$), said ultrasonic touch system further comprising:

a first connection point, each output terminal of said first sets of interdigital receiving transducers ($R_{i,1}$) being connected with each other thereat, a second connection point, each output terminal of said second sets of interdigital receiving transducers ($R_{i,2}$) being connected with each other thereat, a touch on a part of said surface being detected by magnitudes of electric signals detected at said first and second connection points respectively, N switches ($S_i$; i=1, 2, - - - , N), output terminals thereof being connected with each input terminal of said groups of sets of said interdigital emitting transducers ($T_i$), and means for controlling turn on and off of said switches ($S_i$) with a fixed period for switching.

13. An ultrasonic touch system according to claim 11, further comprising:

a third connection point, each input terminal of said switches ($S_i$) being connected with each other thereat, an amplifier, said first and second connection points being connected with said third connection point through said amplifier, and N oscillators ($H_i$; i=1, 2, - - - , N) including N corresponding propagation paths ($D_i$; i=1, 2, - - - , N) as delay elements, said propagation paths ($D_i$) comprising said substrate between said groups of sets of interdigital emitting transducers ($T_i$) and said first sets of interdigital receiving transducers ($R_{i,1}$), the respective signal loops of said oscillators comprising said groups of sets of interdigital emitting transducers ($Ti$), said propagation paths ($Di$), said first sets of interdigital receiving transducers ($R_{i,1}$) and said amplifier.

14. A touch activated panel comprising:

a substrate having an emitter transducer and a receiver transducer on a surface thereof which face each other so that an acoustic wave transmitted into said substrate by said emitter transducer is received by said receiver transducer, said two transducers being separated by a portion of said substrate which, when touched, modifies the acoustic wave received by said receiver transducer;

each of said emitter and receiver transducers comprising, a first plurality of parallel interdigital transducer elements which are generally perpendicular to an axis of a propagation path between said emitter transducer and said receiver transducer and which are spaced apart to have a first interdigital periodicity, and a second plurality of interdigital transducer elements which are parallel to said first plurality of transducer elements and which are spaced apart to have a second interdigital periodicity, whereby said emitter and receiver transducers are responsive to frequencies corresponding to said first and second interdigital periodicities.

15. The touch activated panel of claim 14 wherein a first frequency corresponding to said first interdigital periodicity is higher than a second frequency corresponding to said second interdigital periodicity, and wherein said first plurality of elements in said emitter transducer are closer to said first plurality of elements in said receiver transducer along the axis of the propagation path than said second plurality of elements in said emitter transducer are to said second plurality of elements in said receiver transducer.

* * * * *